(12) United States Patent
Singh et al.

(10) Patent No.: US 11,418,480 B2
(45) Date of Patent: *Aug. 16, 2022

(54) TRANSLATING A NETWORK CONFIGURATION REQUEST FOR A NETWORK CONTROL APPARATUS

(71) Applicant: Verizon Patent and Licensing Inc., Basking Ridge, NJ (US)

(72) Inventors: Jasdip Singh, Ashburn, VA (US); Kasper Van Benten, Potomac Falls, VA (US); Paul Roach, Thompsons Station, TN (US); Markus Baur, Redwood City, CA (US); Jeff Isaksen, Syracuse, UT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,786

(22) Filed: Jul. 1, 2020

(65) Prior Publication Data
US 2020/0403968 A1 Dec. 24, 2020

Related U.S. Application Data

(63) Continuation of application No. 15/975,561, filed on May 9, 2018, now Pat. No. 10,742,597, which is a
(Continued)

(51) Int. Cl.
*H04L 61/5076* (2022.01)
*H04L 61/4511* (2022.01)
(Continued)

(52) U.S. Cl.
CPC ...... *H04L 61/2076* (2013.01); *H04L 41/0226* (2013.01); *H04L 41/082* (2013.01);
(Continued)

(58) Field of Classification Search
CPC ... H04L 41/0226; H04L 41/22; H04L 41/082; H04L 41/0813; H04L 41/0806;
(Continued)

(56) References Cited

U.S. PATENT DOCUMENTS 6,243,749 B1   6/2001  Sitaraman et al.
6,374,295 B2*  4/2002  Farrow ............ H04L 29/12216
                                                        709/223
(Continued)

OTHER PUBLICATIONS

Cisco Systems, Inc., "Cisco DNS/DHCP Manager", printed from http://mwrns.noaa.gov/cisco/cc/td/doc/resprdct/res31.htm, Sep. 10, 1998, 4 pages.
(Continued)

*Primary Examiner* — Gregory Todd

(57) ABSTRACT

An enterprise network may be managed by enabling provision of a graphical user interface that shows IP address allocations for the network and that allows a user to configure DHCP scopes, receiving a DHCP scope request based on a user interaction with the graphical user interface, translating the request into a protocol for communicating with a DHCP control server, providing the translated request to the DHCP control server for processing at the DHCP control server, and updating configurations of multiple DHCP servers. The updated configurations may be sent from the DHCP control server to a configuration storage system and the multiple DHCP servers may be enabled to access the updated configurations from the configuration storage system.

19 Claims, 29 Drawing Sheets

Related U.S. Application Data continuation of application No. 11/941,897, filed on Nov. 16, 2007, now Pat. No. 9,998,423.

(60) Provisional application No. 60/984,365, filed on Oct. 31, 2007, provisional application No. 60/868,670, filed on Dec. 5, 2006.

(51) Int. Cl.

| | | |
|---|---|---|
| *H04L 41/082* | (2022.01) | |
| *H04L 41/22* | (2022.01) | |
| *H04L 41/0803* | (2022.01) | |
| *H04L 41/0226* | (2022.01) | |
| *H04L 41/0806* | (2022.01) | |
| *H04L 41/0813* | (2022.01) | |
| *H04L 41/00* | (2022.01) | |
| *H04L 61/4523* | (2022.01) | |
| *H04L 41/0266* | (2022.01) | |
| *H04L 41/0853* | (2022.01) | |
| *H04L 41/0859* | (2022.01) | |

(52) U.S. Cl.
CPC ...... *H04L 41/0803* (2013.01); *H04L 41/0806* (2013.01); *H04L 41/0813* (2013.01); *H04L 41/22* (2013.01); *H04L 41/26* (2013.01); *H04L 61/1511* (2013.01); *H04L 41/0266* (2013.01); *H04L 41/0856* (2013.01); *H04L 41/0863* (2013.01); *H04L 61/1523* (2013.01)

(58) Field of Classification Search
CPC ............. H04L 41/0803; H04L 61/1511; H04L 61/2076; H04L 61/1523; H04L 41/26; H04L 41/0266; H04L 41/0856; H04L 41/0863

See application file for complete search history.

(56) References Cited

U.S. PATENT DOCUMENTS

| | | |
|---|---|---|
| 6,643,694 B1 | 11/2003 | Chernin |
| 6,701,329 B1 | 3/2004 | Esibov et al. |
| 6,928,167 B1 | 8/2005 | Maeda et al. |
| 7,013,343 B2 | 3/2006 | Shigezumi |
| 7,051,089 B1 | 5/2006 | Johnson et al. |
| 7,117,227 B2 | 10/2006 | Call |
| 7,197,549 B1 | 3/2007 | Salama et al. |
| 7,251,826 B1 | 7/2007 | Gardos et al. |
| 7,281,037 B2 | 10/2007 | Bahlmann |
| 7,283,519 B2 | 10/2007 | Girard |
| 7,302,484 B1 | 11/2007 | Stapp et al. |
| 7,342,906 B1 | 3/2008 | Calhoun |
| 7,418,488 B1 | 8/2008 | Amin et al. |
| 7,623,547 B2 | 11/2009 | Dooley et al. |
| 7,761,570 B1 | 7/2010 | Halley |
| 7,788,345 B1 | 8/2010 | Sukiman et al. |
| 8,255,509 B2 | 8/2012 | Draca et al. |
| 8,259,597 B1 | 9/2012 | Oak |
| 8,321,567 B1 | 11/2012 | Sheth |
| 8,862,735 B1 | 10/2014 | Singh et al. |
| 9,998,423 B1 | 6/2018 | Singh et al. |
| 2002/0010767 A1 | 1/2002 | Farrow et al. |
| 2002/0176404 A1 | 11/2002 | Girard |
| 2004/0255048 A1* | 12/2004 | Lev Ran ............. G06F 16/9574 709/249 |
| 2004/0261116 A1 | 12/2004 | Mckeown et al. |
| 2005/0066041 A1 | 3/2005 | Chin et al. |
| 2005/0182781 A1* | 8/2005 | Bouvet ............... H04L 29/1216 707/999.102 |
| 2005/0262218 A1 | 11/2005 | Cox et al. |
| 2006/0050862 A1* | 3/2006 | Shen .................... H04Q 3/0062 379/219 |
| 2006/0092861 A1 | 5/2006 | Corday et al. |
| 2006/0256813 A1* | 11/2006 | Brusca ................ H04L 41/0226 370/466 |
| 2007/0067361 A1 | 3/2007 | Bailey et al. |
| 2007/0203999 A1 | 8/2007 | Townsley et al. |
| 2008/0005298 A1 | 1/2008 | Busalacchi et al. |
| 2008/0098084 A1 | 4/2008 | Volz et al. |
| 2008/0101353 A1 | 5/2008 | Streijl et al. |
| 2008/0140847 A1 | 6/2008 | Almog |

OTHER PUBLICATIONS

Cisco Systems, Inc., "Cisco DNS/DHCP Manager V.1.1 ", printed from http://www.combinel.com/warp/public/751/dnsmg/dnsmg_ds.htm, Sep. 10, 1998, 4 pages.

Cisco Systems, Inc., "Cisco DNS/DHCP Manager V.1.1 ", printed from http://www.combinet.com/warp/public/751/dnsmg/dnsmg_pa.htm, Sep. 10, 1998, 7 pages.

Lucent Technologies, "VitalQIP registration Manager 2.1 Add-on Module Software", http://web.archive.org/web/20040228105105/http://www.lucent.com/livelink/090094038003cebb_Brochure_datasheet.pdf, Feb. 28, 2004, 2 pages.

phpiP.Net, "What is phpiP", May 9, 2006, http://lweb.archive.org/web/20060509020746/http://www.phpip.net/about.php, p. 1.

InfoBlox, "Infoblox NIOS v4 Software", Jun. 19, 2006, p. 1-7.

InfoBlox, "ID Aware DHCP Toolkit", Jun. 19, 2006, p. 1-3.

InfoBlox, "DNSone with Keystone Package", Jun. 19, 2006, p. 1-4.

Lucent Technologies, VitalQIP 7.0 Software New Features and Enhancements, 715/2006. pp. 1-7.

U.S. Appl. No. 11/941,903, filed Nov. 16, 2007.

U.S. Appl. No. 11/941,901, filed Nov. 16, 2007.

Office Action issued in U.S. Appl. No. 11/941,903 dated Sep. 30, 2009.

Infoblox, Infoblox Integrated IP Address Management Solution, Dec. 14, 2009, www.infoblox.com, White paper, pp. 1-15.

\* cited by examiner

1100 — Update an IP address    SAVE  CANCEL  DELETE

DHCP Scope Information

| | | |
|---|---|---|
| *Name | 10.8.4.10-10.8.4.11 ◄── 1101 | Read-only |
| *Description | EXAMPLE DHCP SCOPE ◄── 1102 | |
| *DHCP Server IPs | 10.159.142.90 ◄── 1103 | |
| *DNS Server IPs | 10.1.1.1 ◄── 1104 | |
| *Router IP | 10.8.4.10 ◄── 1105 | |
| *Router Netmask | 255.255.255.0 ◄── 1106 | |
| *Domain Name | a.com ◄── 1107 | |
| *Lease Duration | 12345 ◄── 1108 | |
| DHCP Options | Name: domain b   Values, Comma-Separated: "b.com" | ◄── 1109 |

IP Addresses (1110)

| Name | Type | *MAC Address | *Description | UserID | Host Name |
|---|---|---|---|---|---|
| 10.8.4.10 | AVAIL. | | | | |
| 10.8.4.11 | RESER. | 11:00:22:00 | A and B | A Person | aperson.com |

*Owners (1111)
People
None
EDIT

Groups
1 ITEM FOUND

| GROUP NAME | DESCRIPTION |
|---|---|
| GROUP X | |

EDIT

*Contact (1112)
People
None
EDIT

Groups
1 ITEM FOUND

| GROUP NAME | DESCRIPTION |
|---|---|
| GROUP X | |

EDIT

*Changed (1113)
12/10/04 12:13AM  USER 1

Location Information ◄── 1114
Room Number
Building Level
Location Code    Location Code 1

Building Name    Building 1
Description      Across from the Cafeteria
Street Address   123 Main Street
City             Anywhere
State            Any State
Zip Code         12345
Country          United States 1115  1116  1117

SAVE  CANCEL  DELETE

Fig. 11

Shared Network Management

1300

Shared Network Information

| | |
|---|---|
| *Shared Network Name | Example Shared Network — 1310 |
| Description | ▼ — 1320 |
| Additional Information | ▼ — 1330 |
| Owners — 1340 | Please note that only owners will be able to updated and delete shared networks. Rights to create shared networks do not automatically become update rights. Please be sure to add the correct owner groups when created a shared network<br><br>None<br><br>(EDIT) |
| *Members — 1350 | There must be at least two networks listed, and networks may only be part of one shared network. DHCP Scopes cannot directly by part of a shared network (only their parent networks). Also, the ancestor (or parent) of a network may not be part of the same shared network as any of the members. If any of these conditiosna re not<br><br>2 items found, showing all items |

| Name | Status | Description | Contact | Site Type | Location Code | ASN |
|---|---|---|---|---|---|---|
| 10.0.1/32 | Allocated | Example Network | Person A | Other | | |
| 10.0.1/32 | Allocated | Example Network | Person B | Other | | |

1360 — 1380

(SAVE) (CANCEL) (DELETE) — 1370

(SAVE) (CANCEL) (DELETE)

Blacklisting — CLOSE

Blocking a MAC address instructs DHCP to no longer issue an IP address for that MAC address. Unblocking reverses this.

Block MAC Addresses

Please enter one of more MAC addresses to block using either a comma or a line feed to delimit them, along with a comment.

- MAC Address(es): aa:bb:cc:dd:ee:ff — 1410a
- Comment: — 1410b

BLOCK — 1420

Search Blocked MAC Addresses — SHOW ALL — 1430

| MAC Address | |
| Comment | |
| Date | From: To: |

SEARCH — 1440

Matching Blocked MAC Addresses — 1450

No items found

| MAC Address | Date | Comment |
| --- | --- | --- |
| Nothing found to display | | |

1460 — UNBLOCK SELECTED — SELECT ALL (1470) — SELECT NONE (1480) — CLOSE — 1490

Fig. 14

TRANSLATING A NETWORK CONFIGURATION REQUEST FOR A NETWORK CONTROL APPARATUS

CROSS REFERENCE TO RELATED APPLICATIONS

This application is a continuation of pending U.S. application Ser. No. 15/975,561, filed on May 9, 2018, which is a continuation of U.S. application Ser. No. 11/941,897, filed Nov. 16, 2007, now U.S. Pat. No. 9,998,423, issued on Jun. 12, 2018, which claims the benefit of priority to U.S. Provisional Patent Application No. 60/868,670, filed Dec. 5, 2006, and U.S. Provisional Patent Application No. 60/984,365, filed Oct. 31, 2007, all of which are incorporated herein by reference in their entirety.

TECHNICAL FIELD

This disclosure relates to network management.

BACKGROUND

An Internet Protocol (IP) address is a unique number that devices may use in order to identify and communicate with each other on a computer network configured to use the Internet Protocol standard. A Media Access Control (MAC) address is a unique identifier attached to most forms of networking equipment. Dynamic Host Configuration Protocol (DHCP) enables allocation of IP addresses to client hosts. Domain Name server or System (DNS) enables translation of domain names (e.g., computer host names) to IP addresses. Internet Protocol Address Management (IPAM) enables management of an address space in a network.

SUMMARY

In a first general aspect, an enterprise network is managed. Provision of a graphical user interface that shows IP address allocations for the network and that allows a user to configure DHCP scopes is enabled. A DHCP scope request based on a user interaction with the graphical user interface is received. The request is translated into a protocol for communicating with a DHCP control server. The translated request is provided to the DHCP control server. The translated request is processed at the DHCP control server. Based on the processing, configurations of multiple DHCP servers are updated. The updated configurations are provided from the DHCP control server to a configuration storage system. The multiple DHCP servers are enabled to access the updated configurations from the configuration storage system.

With respect to at least the first general aspect, implementations may include one or more of the following features. For example, the multiple DHCP servers may be enabled to read the updated configurations from the configuration storage system and restart. A response may be sent from the DHCP control server to an application that provides the graphical user interface. The response may indicate a valid or invalid translated request and the success or failure of updating the configurations of the multiple DHCP servers. DHCP lease information may be sent to the DHCP control server from the multiple DHCP servers. Translating the request into a protocol for communicating with the DHCP control server may include translating the request into an XML-based protocol.

Receiving a DHCP scope request based on a user interaction with the graphical user interface may include receiving a request to create, update, or delete a DHCP scope. Updating configurations of multiple DHCP servers may include updating configurations of multiple DHCP servers to include a newly created scope, an updated scope, or a deleted scope based on the received request. Receiving a DHCP scope request based on a user interaction with the graphical user interface may include receiving a request to create a DHCP scope. The request may include a scope range, DHCP and DNS server IP addresses, router IP address and netmask, domain name, default lease duration, reserved IP addresses within the scope, and/or MAC addresses associated with the reserved IP addresses. Receiving a DHCP scope request based on a user interaction with the graphical user interface may include receiving a request to lookup one or more scopes. The multiple DHCP servers may be controlled to provide information regarding the requested scope or scopes.

Receiving a DHCP scope request based on a user interaction with the graphical user interface may include receiving a request to blacklist a MAC address. Updating configurations of multiple DHCP servers may include updating configurations of multiple DHCP servers such that an IP address is not allocated to the blacklisted MAC address by any of the multiple DHCP servers.

In a second general aspect, an enterprise network is managed. A DHCP scope request based on a user interaction with a graphical user interface is received at a DHCP control server. The graphical user interface shows IP address allocations for the network and allows a user to configure DHCP scopes. Configurations of multiple DHCP servers are updated at the DHCP control server. The updated configurations are provided from the DHCP control server to the multiple DHCP servers.

With respect to at least the second general aspect, implementations may include one or more of the following features. For example, the request may be translated into a protocol for communicating with a DHCP control server, the translated request may be provided to the DHCP control server, and the translated request may be processed at the DHCP control server. Translating the request into a protocol for communicating with the DHCP control server may include translating the request into an XML-based protocol.

The multiple DHCP servers may be enabled to access the updated configurations from the configuration storage system. The multiple DHCP servers may be enabled to read the updated configurations from the configuration storage system and restart.

A response may be sent from the DHCP control server to an application that provides the graphical user interface. The response may indicate a valid or invalid translated request and the success or failure of updating the configurations of the multiple DHCP servers. DHCP lease information may be sent to the DHCP control server from the multiple DHCP servers.

Receiving a DHCP scope request based on a user interaction with the graphical user interface may include receiving a request to create, update, or delete a DHCP scope. Updating configurations of multiple DHCP servers may include updating configurations of multiple DHCP servers to include a newly created scope, an updated scope, or a deleted scope based on the received request. Receiving a DHCP scope request based on a user interaction with the graphical user interface may include receiving a request to create a DHCP scope, the request including at least one of a scope range, DHCP and DNS server IP addresses, router IP address and netmask, domain name, default lease duration, reserved IP addresses within the scope, and MAC addresses associated with the reserved IP addresses. Receiving a DHCP scope request based on a user interaction with the graphical user interface may include receiving a request to lookup one or more scopes, and further comprising controlling the multiple DHCP servers to provide information regarding the requested scope or scopes.

Receiving a DHCP scope request based on a user interaction with the graphical user interface may include receiving a request to blacklist a MAC address. Updating configurations of multiple DHCP servers may include updating configurations of multiple DHCP servers such that an IP address is not allocated to the blacklisted MAC address by any of de multiple DHCP servers.

In a third general aspect, a system manages an enterprise network. The system includes a display application that provides a graphical user interface configured to display IP address allocations for the network and to receive a DHCP scope request entered by the user. The system includes a translation service configured to translate the request into a protocol for communicating between the display application and a DHCP control server and to provide the translated request to the DHCP control server. The system includes a DHCP control server configured to process the translated request, to update configurations of multiple DHCP servers based on the processing, to provide the updated configurations to a configuration storage system, and to provide a response to the graphical user interface indicating the success or failure of the processing of the translated request and/or updating of the configurations of the multiple DHCP servers. The system includes a configuration storage system configured to store configurations of multiple DHCP servers, to receive updates to the configurations of the multiple DHCP servers from the DHCP control server, and to enable the multiple DHCP servers to access the configurations. The system includes multiple DHCP servers configured to access the updated configurations of the multiple DHCP servers from the configuration storage system.

With respect to at least the third general aspect, implementations may include one or more of the following features. For example, the multiple DHCP servers may be configured to read the updated configurations from the configuration storage system and restart. The DHCP control server may be configured to send a response from the DHCP control server to an application that provides the graphical user interface. The response may indicate a valid or invalid translated request and the success or failure of updating the configurations of the multiple DHCP servers.

The multiple DHCP servers may be configured to send DHCP lease information to the DHCP control server. The translation service being configured to translate the request into a protocol for communicating with the DHCP control server may include being configured to translate the request into an XML-based protocol.

The display application being configured to receive a DHCP scope request entered by the user may include being configured to receive a request to create, update, or delete a DHCP scope. The configuration storage system being configured to receive updates to the configurations of the multiple DHCP servers from the DHCP control server may include being configured to receive updates to the configurations of the multiple DHCP servers that include a newly created scope, an updated scope, or a deleted scope based on the received request. The display application being configured to receive a request to create a DHCP scope may include being configured to receive a request including at least one of a scope range, DHCP and DNS server IP addresses, router IP address and netmask, domain name, default lease duration, reserved IP addresses within the scope, and MAC addresses associated with the reserved IP addresses.

The display application being configured to receive a DHCP scope request entered by the user may include being configured to receive a request to lookup one or more scopes. The display application may be configured to control the multiple DHCP servers to provide information regarding the requested scope or scopes.

The graphical user interface may be configured to receive a request from the user to block a MAC address. The DHCP control server may be configured to update the configurations of the multiple DHCP server such that P addresses are not allocated to the MAC address.

Implementations of any of the techniques described may include a method or process, an apparatus or system, or computer software on a computer-accessible medium. The details of particular implementations are set forth below. Other features will be apparent from the description and drawings.

DESCRIPTION OF DRAWINGS

FIGS. 11-14 are illustrations of graphical user interfaces (GUIs) that may be presented to a user as part of the IPAM GUI. More particularly, FIG. 11 is an illustration of a DHCP scope detail page;

FIG. 12 is an illustration of a summary of a shared network to which a particular DHCP scope (or IP address) belongs;

FIG. 13 is an illustration of a shared network management page that displays information about a shared network; and FIG. 14 is an illustration of a one-click blacklisting page.

DETAILED DESCRIPTION

Figure 1:
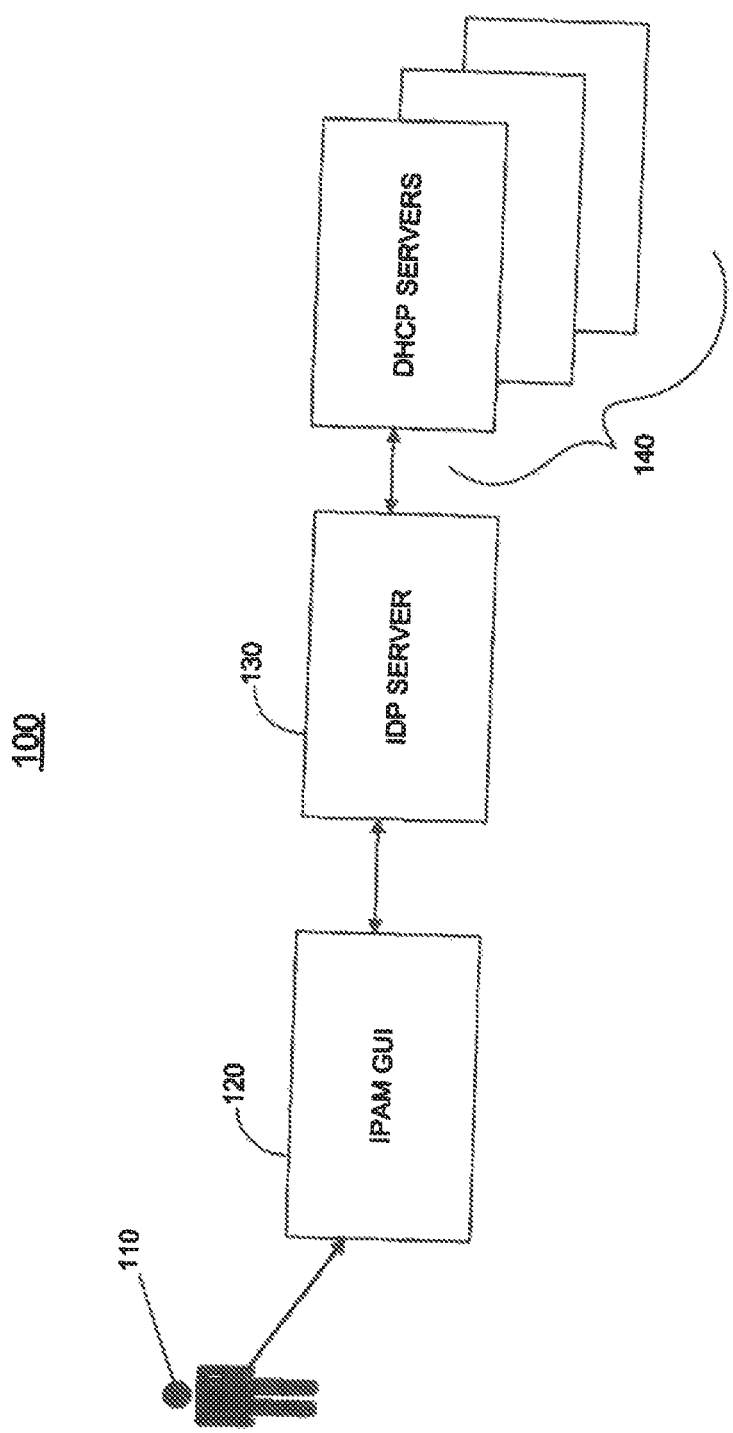
FIG. 1 is a block diagram that represents an example of a logical view of an IDP system architecture.

A system may be configured to perform enterprise level management of Internet Protocol (IP) address space (both public and private). In general, there may be at least three technologies involved in managing IP address space: (1) Dynamic Host Configuration Protocol (DHCP), which provides Machine Access Code (MAC) address to IP address translation; (2) Domain Name server or System (DNS), which provides host name to IP address translation; and (3) IP Address Management (IPAM), which reflects available IP addresses (and may be stored in an IP Address Registry). IPAM supports managing and administering the distribution of available IP addresses to different subnetworks and machines in the networks. A subnetwork (or subnet) is a division of a computer network that functions as an independent network in order to simplify addressing between numerous computers and for greater security; however, to remote networks, a subnetwork may not appear separate from its parent network.

IPAM-DHCP Protocol

An Extensible Markup Language (XML) protocol may be configured to enable communication between the IPAM system and the DHCP system so that the DHCP system may be managed through the IPAM interface. Doing so may provide a more holistic (and, in some instances, looselycoupled) approach to the management of an IP address space by allowing IPAM to support administering DHCP in general or, more specifically, to support administering DHCP scopes and reserved and unreserved IP addresses within scopes. A scope, or DHCP scope, is a pool of IP addresses that is available to a particular DHCP server for allocation. The XML protocol may be referred to as IDP, which stands for IPAM-DHCP Protocol. IDP may enable the development of an overall picture of how the IP address space is being allocated and used within the DHCP system.

More particularly, IDP may be implemented as an XMLbased synchronous client-server protocol that enables an IPAM Graphical User Interface (GUI) and other clients to interact with a service controlling some or all of the DHCP servers within an enterprise network. The IPAM GUI may enable access to IP address allocations through a secure web interface available from within the network of an enterprise whose IP address space is being managed. Once authenticated, an administrator may look up information on current IP address allocations and perform updates to the IP address space directly from within IPAM. With the use of IDP, the administrator also may be able to manage DHCP scopes using the IPAM GUI, in addition to IP address allocations.

IDP may be generic enough to enable communication with any DHCP sewer implementations that currently exist or may be forthcoming in the future. In one example, IDP is configured to enable communication with ISC DHCP servers. ISC stands for Internet Software Consortium, which is an organization that provides open source DHCP and DNS products.

In one implementation, to create, update, or delete a scope, an administrator may submit a relevant request to the IPAM GUI. The IPAM GUI may consequentially send a scope request to a translation service referred to as an IDP client Application Program Interface (API). The IDP client API is an intermediary between the IPAM GUT and a DHCP control server, referred to as an IDP server. The IDP client API may be responsible for converting, or translating, a request received by the IDP client API from the IPAM GUI (initiated by an administrator) into an IDP XML-compliant message. Such translation may be used in implementations in which the IPAM GUI provides the request to the IDP client API in some other format, such as, for example, in Hypertext Markup Language (HTML) or as a Java object. The IDP client API also may be responsible for providing the IDP message to the IDP server, and reporting back the IDP sever response to the IPAM GUI for display to the administrator.

Upon receiving the IDP message, the IDP server may update the configurations of all of the DHCP servers in the infrastructure that are associated with the scope identified in the request and persist the updated configurations in a configuration storage system (e.g., a Concurrent Versions System (CVS)). The CVS may be used to store DHCP server configurations on the IDP server side and allow each DHCP server to periodically (e.g., at a predetermined time or upon the occurrence of a particular event) read its new configuration from the CVS and restart. As such, the IDP server may identify the DHCP servers that are associated with a scope by, for example, querying the configurations stored in the CVS for those that are associated with the scope. The CVS also may enable data backup and recovery of the DHCP server configurations.

The DHCP servers also may regularly push their DHCP lease information to the IDP server to help create a comprehensive picture of a scope (including dynamically used IP addresses, as well as the reserved IP addresses). Thus, an administrator viewing the enterprise's IP address space from the IPAM GUI side may receive a more holistic view of the infrastructure.

In addition, and in some implementations, IDP may be used to track security breaches within the enterprise's network and blacklist offending MAC addresses. A MAC address, which is short for Media Access Control address, and also referred to as a hardware address or an Ethernet address, is a unique code assigned to most forms of networking hardware. A MAC address is permanently assigned to the hardware. The MAC address for a particular piece of hardware may allow a DHCP server to recognize that the hardware may or may not access the network.

For example, a particular user may enter the enterprise's network and engage in undesirable activity (e.g., hacking).

An administrator accessing the registry view (via the IPAM GUI) may be able to easily detect the breach due to the holistic view of the IP address namespace that the IPAM GUI provides. In response to the breach, the administrator can blacklist the particular user's MAC address from the entire DHCP infrastructure (all DHCP servers) by providing a single request via the IPAM GUI. This single action may be referred to as one-click blacklisting. The single request may be routed through the IDP client API and IDP server to the DHCP servers. More particularly, the IDP server may update the configurations of all the DHCP servers in the infrastructure to include the particular user's MAC address on a blacklist. The blacklist may be, for example, integrated with the DHCP server configurations or may be logically located elsewhere and accessed by the DHCP servers as needed. Doing so may effectively block all DHCP serves from providing future allocations of an IP address to the particular user's MAC address.

FIG. 1 is a block diagram 100 that represents an example of a logical view of the IDP system architecture. Block diagram 100 includes user 110, IPAM GUI 120, IDP server 130, and DHCP servers 140.

User 110 may be an administrator who is authorized to perform various operations associated with IP address allocations, DHCP scopes, and shared networks by interacting with the IPAM GUI 120. Such operations may include, for ample, creating, updating, or deleting scopes or shared networks, looking up scopes or shared networks or requesting a list of all scopes or shared networks managed by a particular DHCP sever.

User 110 may access the IPAM GUI 120 through, for example, a web application referred to as a directory management tool (DMT). Additionally, the IPAM GUI 120 may be accessible to the user 110 through, for example, an enterprise's secure Extranet, a secure Internet web page, or a dedicated application that enables secure web access.

The IPAM GUI 120 may interact synchronously with the IDP server 130 by providing requests based on information entered by user 110 via the IPAM GUI 120. Based on requests received from the IPAM GUI 120, the IDP server 130 may control DHCP servers 140 by providing updates to the DHCP server configurations. DHCP servers 140 may include all DHCP servers in an enterprise's address space.

More particularly, the IPAM GUI 120 may provide a request to the IDP server 130; however, the request may be intercepted by an intermediary, such as, for example, an IDP client API, which is described in more detail below. The IDP client API may be configured to translate a request sent by the IPAM GUI 120 into a format that the IDP server 130 can recognize and process. Such a format is referred to as IDP, which stands for IPAM-DHCP Protocol.

In one implementation, IDP may be an XML-based synchronous client-server protocol that enables the IPAM GUI 120 (as well as other clients) to interact with a service (e.g., the IDP server 130) that is configured to control some or all of the DHCP servers (e.g., DHCP servers 140) within an enterprise. IDP may support the management of Internet Protocol version 4 (IPv4) DHCP scopes only, may support the management of Internet Protocol version 6 (IPv6) DHCP scopes only, may support management of both versions, or management of future versions.

IDP may be transmitted using a secure protocol, such as, for example, HyperText Transfer Protocol Secure (HTTPS). HTTPS may be a beneficial transport substrate for IDP because of the level of encryption that it provides.

Various operations may be performed (e.g., based on user requests via the IPAM GUI 120) in response to IDP XML-compliant requests (which may be referred to, interchangeably, as an IDP message or an IDP request). For example, a user may request, via the IPAM GUI 120, one or more of the following functionalities in order to manage an enterprise's DHCP infrastructure (e.g., DHCP servers 140): (i) create a scope, (ii) update a scope, (iii) resize a scope. (iv) delete a scope, (v) lookup a scope, (vi) list candidate scope servers, and (vii) list all scopes. Additionally, a user may mange an enterprise's shared networks by entering requests, via the IPAM GUI 120, for (i) create a shared network, (ii) update a shared network, (iii) delete a shared network, (iv) lookup a shared network, and (v) list all shared networks. Furthermore, a user may manage the blacklisting status of a particular MAC address, via the one-click blacklisting offered by the IPAM GUI 120 with IDP XML-compliant requests by requesting functionalities such as (i) block MAC address, (ii) unblock MAC address, (iii) list blocked MAC addresses, and (iv) whether a MAC address is blocked (e.g., "is MAC address blocked?"). In addition, IDP messages may be used to perform various diagnostic functions.

As such, an IDP request may be generated by the IDP client API, which then may communicate the IDP request (and, thus, the request it embodies) to the IDP server. The IDP server may, in response, provide an IDP XML compliant response back to the IDP client API, which may translate the IDP response into a format that is understandable to the IPAM GUI, and send the translated response back to the IPAM GUI for display to the user.

Figure 2:
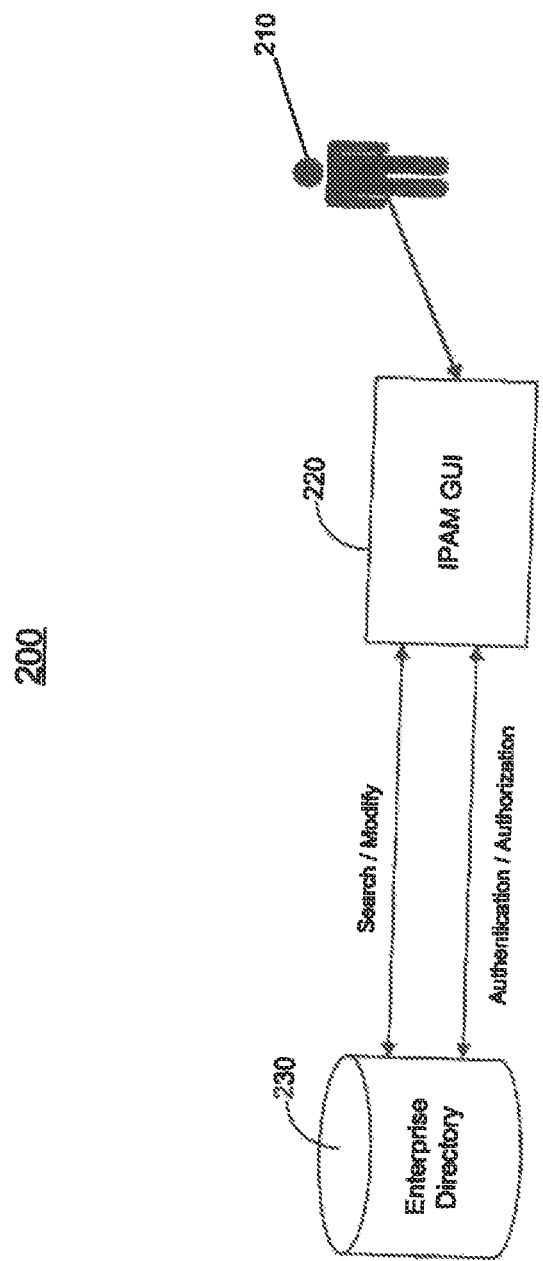
FIG. 2 is a block diagram that represents an example of a logical view of an IPAM architecture.

FIG. 2 is a block diagram 200 that represents an example of a logical view of the architecture of IPAM. Block diagram 200 includes a user 210, IPAM GUI 220, and enterprise directory 230.

Similar to block diagram 100 of FIG. 1, user 210 may be an administrator authorized to perform various operations by interacting with the IPAM GUI 220. Also similar to block diagram 100 of FIG. 1, user 210 may access the PAM GUI 220 through, for example, a web application referred to as a directory management tool (DMT) via an enterprise's secure Extranet, a secure Internet web page, or a dedicated application that enables secure web access.

The IPAM GUI 220 may interact with the enterprise directory 230 using, for example, a directory service API. The directory service API may be, for example, a Java library built on top of a lightweight directory protocol (LDAP), such as, for example, the Netscape LDAP Software Development Kit. In general, LDAP is a protocol used to access a directory listing. The directory service API may enable a user to access the enterprise directory 230 via the IPAM GUI 220.

As such, enterprise directory 230 is an LDAP-based central repository for IPAM data. The enterprise directory 230 also may include data for people (e.g., employees and non-employees) within an enterprise, groups of people, enterprise business units, applications that connect to, and rely on, the enterprise directory 230 for each information, enterprise locations (both physical and logical), software entitlement policies of the enterprise, and allocations of IP addresses among the business units or other logical or physical units of the enterprise.

The IPAM GUI 220 may interact with the enterprise directory 230 in order to perform a variety of functions. In some implementations, the IPAM GUI 220 may interact with the enterprise directory 230 for authentication and/or authorization of user 210 before user 210 may be enabled to perform other functions. For example, user 210 may access the IPAM GUI 220 through a secure web interface via an Extranet or the Internet. The user 210 may be two-factored authenticated against the enterprise directory based on (1) an enterprise identifier (e.g., screen name) that uniquely identifies the user 210 end an associated password, and (2) a secure identifier encrypted using a key algorithm (e.g., the Rivest Shamir Adleman (RSA) public key algorithm). More particularly, the user 210 may provide these three pieces of information into the IPAM GUI 220. The IPAM GUI 220 may, in turn, provide the information to the enterprise directory 230, which may compare the provided information for accuracy, and, if appropriate, inform the IPAM GUI 220 that the user 210 has been authenticated into the IDP system.

Once user 210 is authenticated, the user 210 may perform various junctions via the IPAM GUI 220. In one implementation, the user 210 may interact with the enterprise directory 230, via the IPAM GUI 220, to search or modify information included in the enterprise directory 230. For example, user 210 may access the enterprise directory 230, via the IPAM GUI 220, in order to look up, and perhaps modify, information related to current IP address locations for a particular group of people within the enterprise or within a particular DHCP scope.

Figure 3:
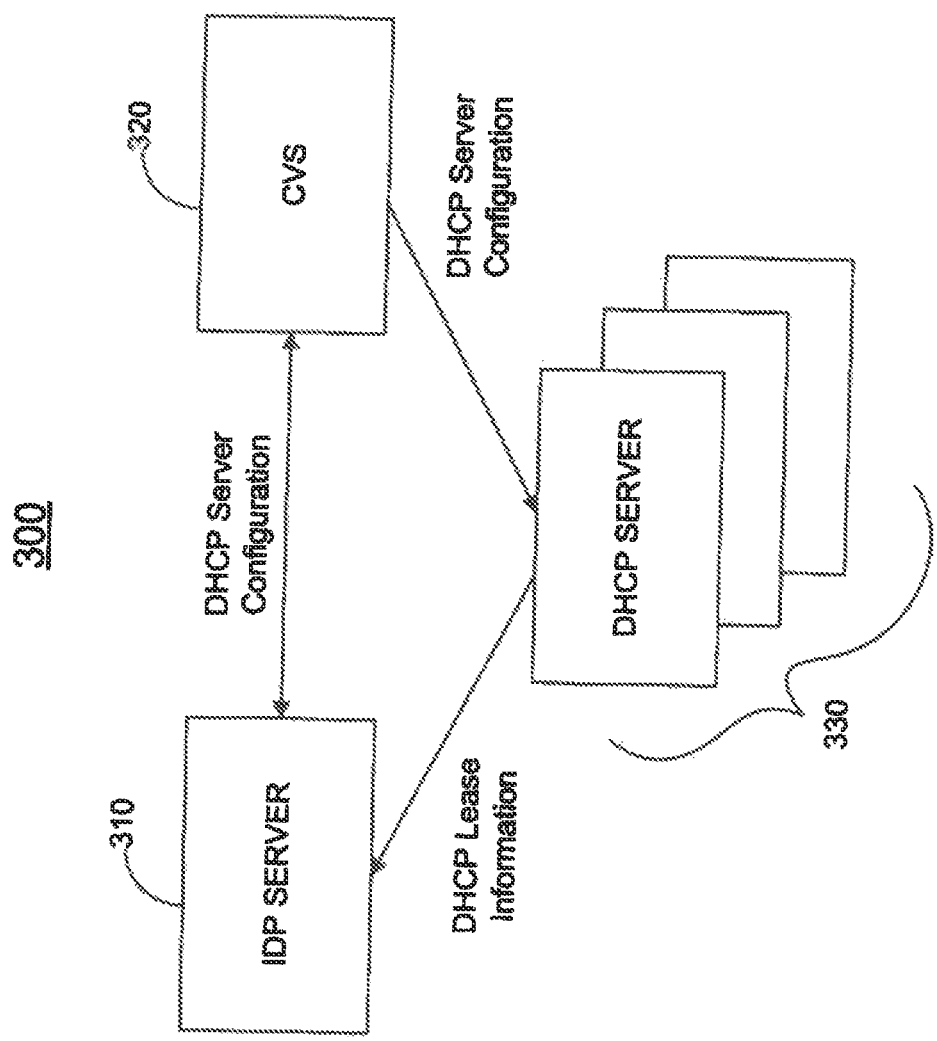
FIG. 3 is a block diagram that represents an example of the interaction between an DP server and the DHCP servers within an enterprise.

FIG. 3 is a block diagram 300 that represents an example of the interaction between an IDP server 310 and DHCP servers 330. As described above, a user may manage an enterprise's DHCP servers via an IPAM GUI Once the user has been authenticated into the system and provides a request to the IPAM GUI, the IPAM GUI may provide the request to an IDP server, such as IDP server 310, via an IDP client API.

The IDP server 310 controls some or all of the DHCP servers within an enterprise, which are represented by DHCP servers 330. For example, if a user has provided a request, via the IPAM GUI, to create a scope (in the enterprise's DHCP servers), the IDP server 310 may update the configurations of the DHCP servers 330 to reflect the creation of the new scope. More particularly, the IDP server 310 may provide an updated DHCP server configuration (e.g., a configuration that includes the new scope) to a Concurrent Versions System (CVS) 320 for storage.

Periodically (e.g., at predetermined intervals or based on occurrence of a particular event), each of the DHCP servers 330 may read the updated configurations from the CVS 320 and restart. In addition, the DHCP servers 330 may periodically (e.g., at predetermined intervals or based on occurrence of a particular event) push DHCP lease information to the IDP server 310, which may communicate this information to the IPAM GUI using IDP. Doing so provides the IDP server 310, and by extension, a user interacting with the IPAM GUI, with a comprehensive picture of a particular scope, IP address allocation, or shared network, such as, for example, information about dynamically used IP addresses and reserved IP addresses.

Additionally, by providing DHCP server configurations to the CVS 320, rather than directly to the DHCP servers 330, data backup and recovery of DHCP server configurations may occur automatically, or manually, from the configurations persisted in the CVS 320.

Figure 4:
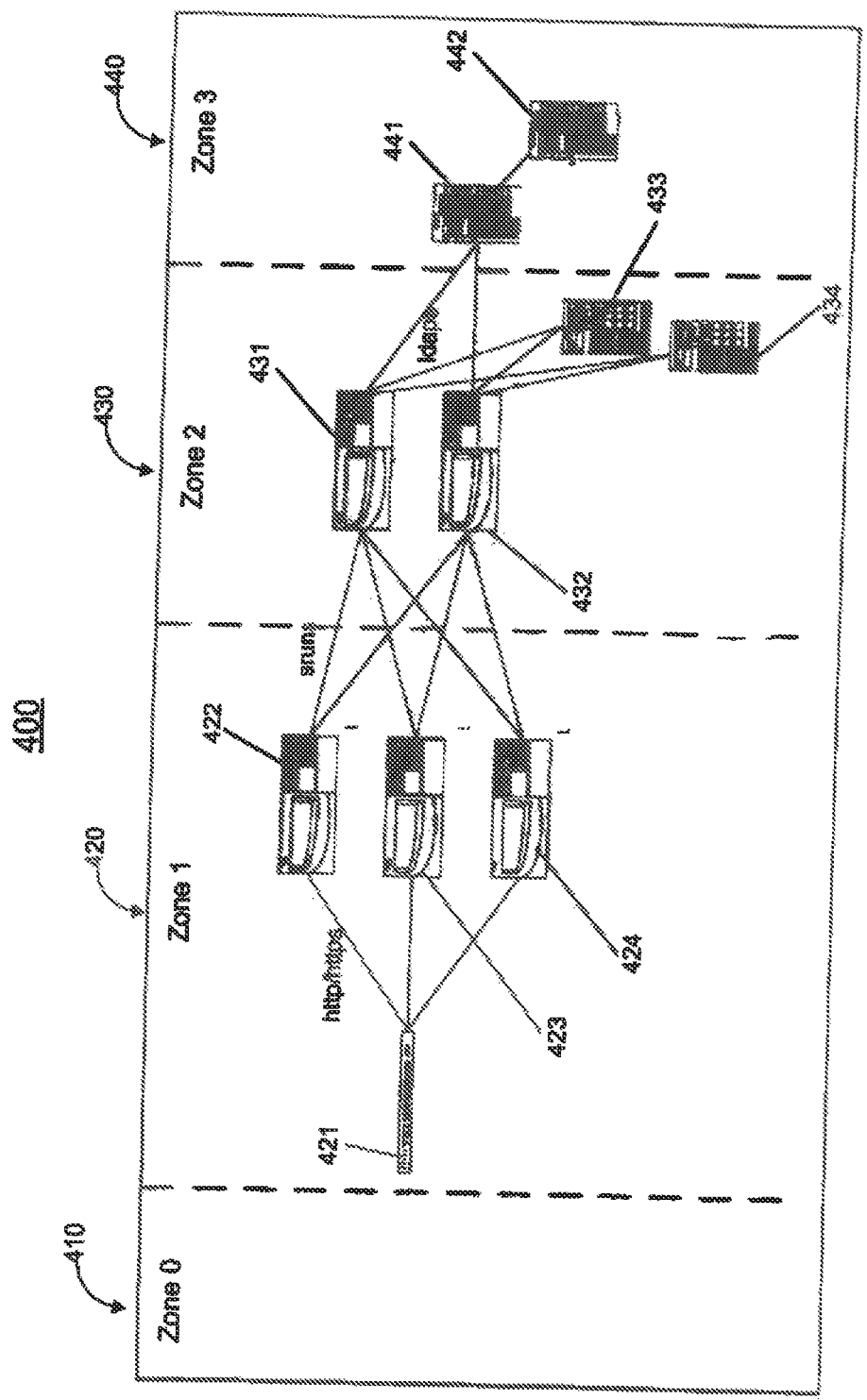
FIG. 4 is a block diagram that represents an example of a physical architecture of an IPAM system.

FIG. 4 is a block diagram 400 that represents an example of a physical architecture of the IPAM system. As shown, block diagram 400 is based on a four-tier model such that a user's machine, the front-ends, application/business logic, and data are each in a separate zone.

In Zone 0 410, a user may access the IPAM GUI in order to perform a variety of functions, as described above. More particularly, a user may access the IPAM GUI from a computer located outside the network, but connected to the network using a secure connection such as, for example, via a Virtual Private Network (VPN). Alternatively, the user may access the IPAM GUI from within the network, such as, for example, from a computer located within Zone 1 420.

The font-end, e.g., the IPAM GUI, may nm on web servers 422-424 in Zone 1 420. Within Zone 1 420, the web servers 422-424 may be load balanced by load balancer 421, which forwards requests via HTTP or HTTPS to one of web servers 422, 423, or 424. The servers 422, 423, and 424 each run a web server that provides the IPAM GUI to the end-user. As such, Zone 1 420 may be referred to as the web layer.

The web servers 422, 423, and/or 424 may interact with one of application servers 431 and 432 located within Zone 2 430. Application servers 431 and 432 implement business logic for the IPAM GUI application. The business logic may be implemented as, for example, Javaserver Pages (JSPs) and/or servlets. As such, Zone 2 430 may be referred to as the application layer. The application servers 431 and 432 may be used for authenticating users and searching entries in the enterprise directory replicas 433 and 434, as well as sending IDP requests to and receiving IDP responses from an IDP server. The enterprise directory replicas 433 and 434, which are also located within Zone 2 430, are replicas of the enterprise directory master 441 in Zone 3 440. The master 441 is used for writing (e.g., adding, modifying, deleting, looking up, and checking existence of an entry) information into the enterprise directory. The enterprise directory master 441 also may be associated with a backup enterprise directory master 442, also in Zone 3 440, in a failover configuration. For example, information stored in the master 441 may be copied into the backup master 442 (and vice versa) such that if the master 441 fails during a write operation, the backup master 442 may immediately be activated and may continue the write operation.

The application servers 431 and 432 may instantiate each connection to the enterprise directory replicas 433 and 434 as an authenticated LDAP connection over secure socket layer (SSL) using application-specific credentials to the enterprise directory replicas 433 and 434 in Zone 2 430 or a designated Virtual IP address (VIP) on a server Load Balancing (SLB) switch in Zone 3 440. Both enterprise directory masters in Zone 3 440 may be connected to the SLB, thereby providing redundancy in case of failure of a single master. Both masters, in turn, replicate the data between themselves so that it is available instantaneously to their counterparts. The SLB is configured such that all requests over a connection from a particular application may be communicated to the same master.

As described above, and shown in FIG. 4, the IPAM system may include three load-balanced web servers 422, 432, and 424 (in Zone 1 420, the web layer) and two application servers 431 and 432 (in Zone 2 430, the application layer). However, in some implementations, the IPAM system may function with only one web server (in Zone 1 420) and one application server (in Zone 2 430). The redundancy, as shown in block diagram 400, may provide high availability and failover.

Figure 5:
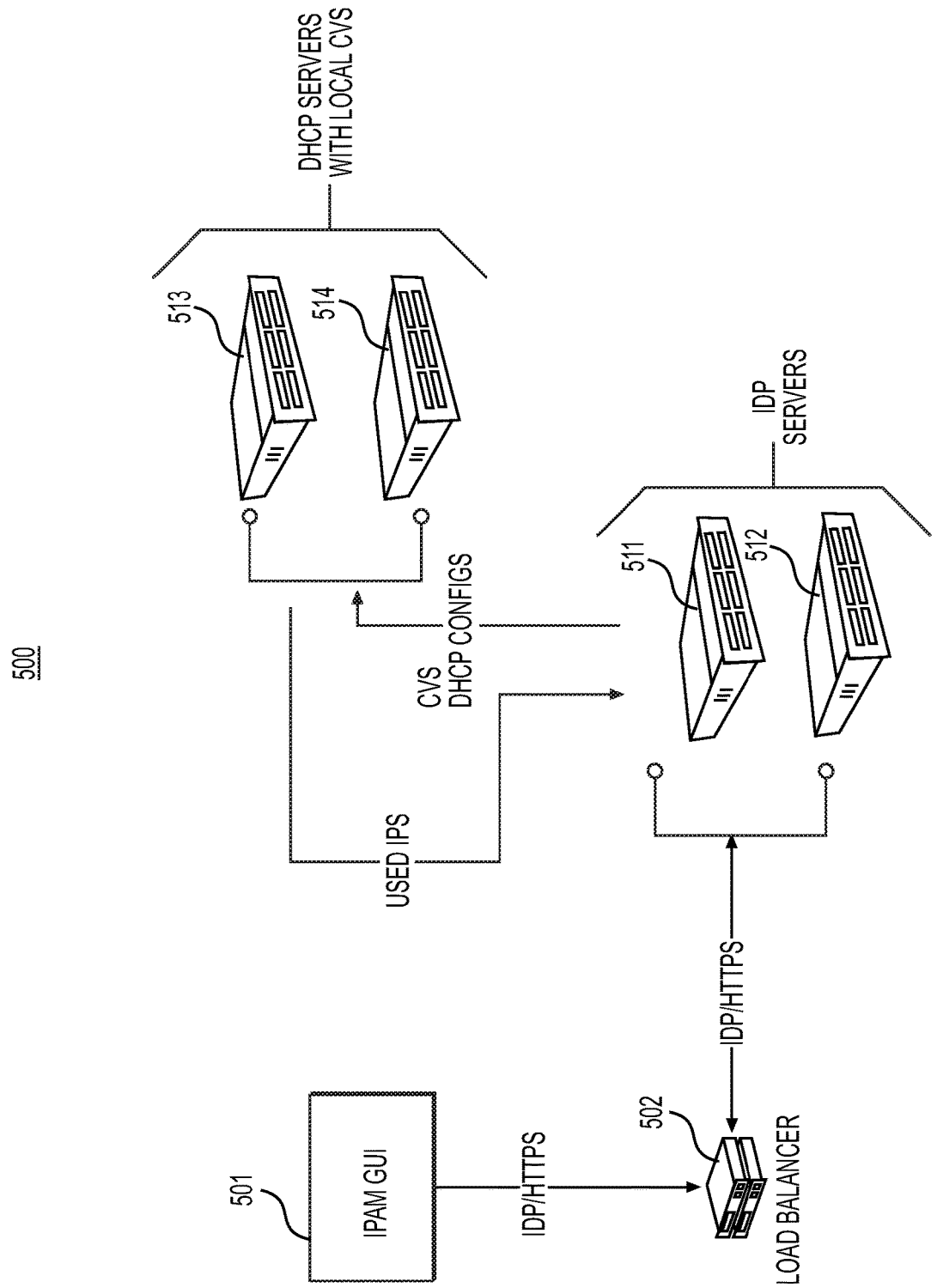
FIG. 5 is a block diagram that represents an example of a physical architecture of an IDP service.

FIG. 5 is a block diagram 500 that represents an example of a physical architecture of an IDP service that allows for administration of DHCP scopes via the IPAM GUI. A user may perform a variety of functions via the IPAM GUI 501, the physical architecture of which is described above with respect to block diagram 400 of FIG. 4. The IPAM GUI then may communicate with the IDP service via the IDP protocol over HTTPS.

As shown, the IDP service may be implemented with a pair of load-balanced (via load balancer 502) IDP servers 511 and 512. The IDP servers 511 and 512 may have active/passive redundancy, such that at any given time, one IDP server (e.g., 511) is active and one IDP server (e.g., 512) is passive. If the active server fails, the passive server, when beneficial, may be manually started to assume the role of the failed active server. As such, the IDP servers may swap functionality (e.g., IDP server 512 is active and IDP server 511 is passive).

When creating, updating, or deleting a particular scope, one of IDP servers 511 or 512 (e.g., the active server) may update configurations of DHCP servers 513 and 514 for the particular scope and persist the configurations in the local CVSs. The CVSs may be available to both IDP servers 511 and 512 over a network file system (NFS).

In some implementations, and as shown, the CVS for each DHCP server may be boded on the same machine that hosts the DHCP server. Additionally, or alternatively, the CVS for a particular DHCP server may be hosted on its own machine. The DHCP servers 513 and 514 may periodically push their DHCP lease information to one of IDP servers 511 and 512 (e.g., the active server), or both.

In some implementations, there may be five types of DHCP sites:
- Type 0: A site that does not have its own DHCP servers, but rather points to DHCP servers located elsewhere. A Type 0 DHCP site also may be referred to as a Remote Site.
- Type 1: A site that has one DHCP server in a standalone configuration. The server hardware may be shared with other services.
- Type 2: A site that has two DHCP servers in a failover configuration. The server hardware may be shared with other services.
- Type 3: A site that has one DHCP server in a standalone configuration. The server hardware may not be shared with any other service due to, for example, stability concerns.
- Type 4: A site that has two DHCP servers in a failover configuration. The server hardware may not be shared with any other service due to, for example, stability concerns.

Alternatively, less than five of the DHCP site types may be available in a particular implementation.

In one implementation, each DHCP server may nm, for example, ISC DHCP v3.0.2 (e.g., a DHCP configuration provided by the Internet Software Consortium) in a failover configuration. The DHCP server may be configured to periodically (e.g., every 30 minutes) check for updates to its configuration file in the CVS. If updates are present, the DHCP server retrieves them using for example, a CVS update command and restarts.

Figure 6A:
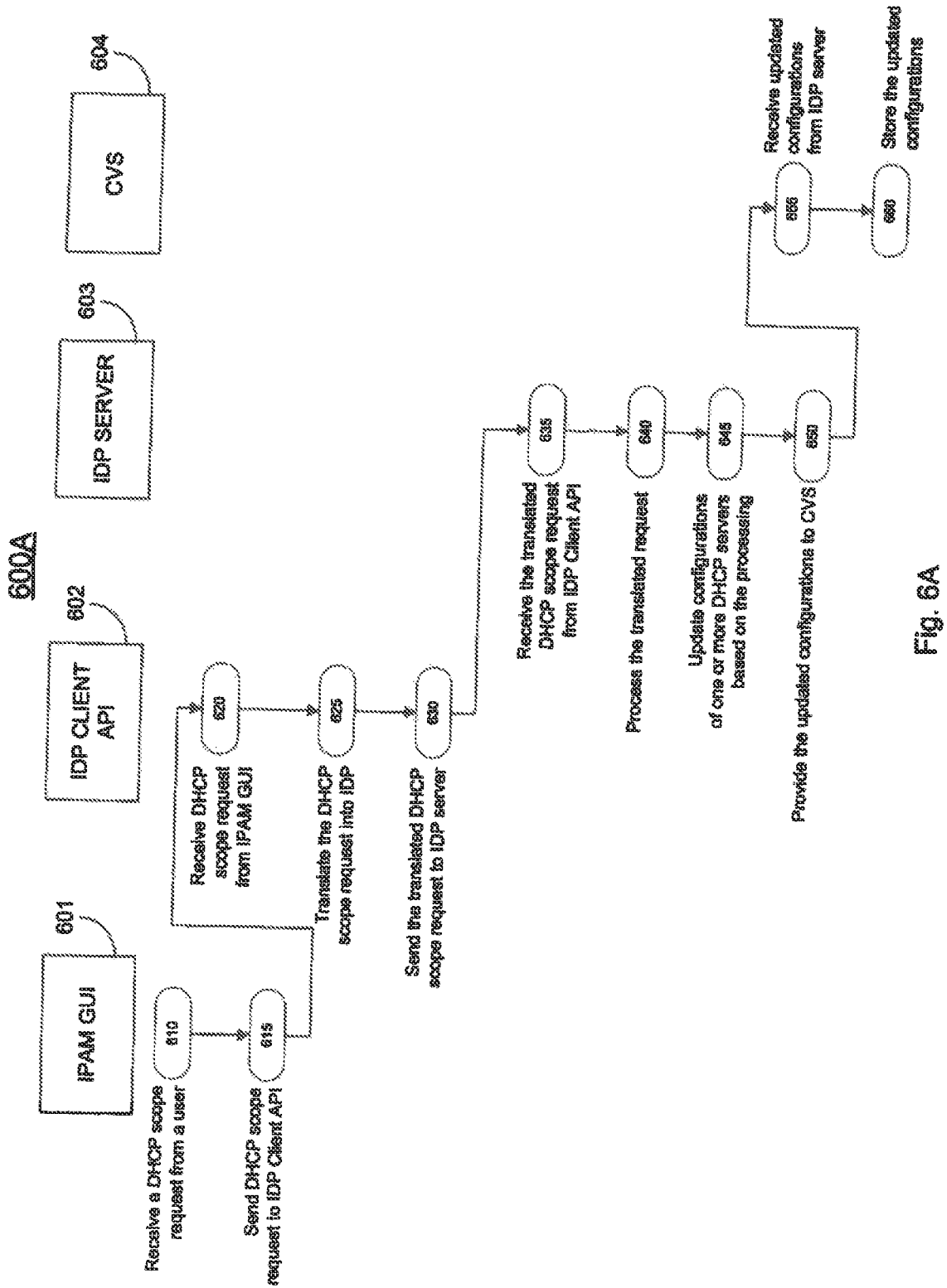
FIG. 6A is a flow chart of an example of a process for updating DHCP configurations and FIG. 6B is a flow chart of an example of a process for providing updated DHCP configurations to multiple DHCP servers.
Figure 6B:
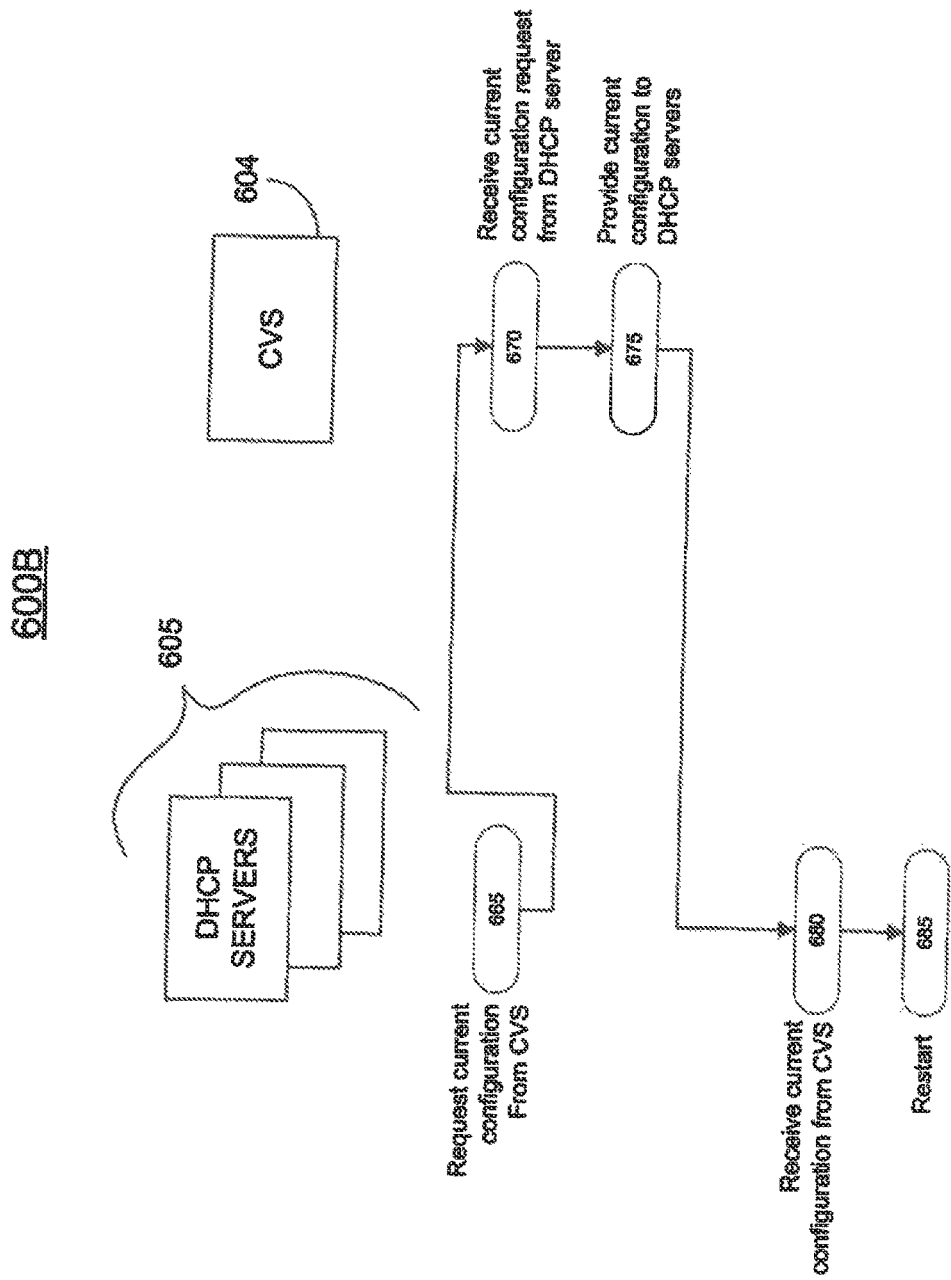

FIG. 6A is a flow chart of an example of a process 600A for updating DHCP configurations and FIG. 6B is a flow chart of an example of a process 600B for providing updated DHCP configurations to multiple DHCP servers. Generally, the operations of processes 600A and 600B may be used in conjunction with the systems and configurations described earlier in, for example, FIGS. 1-5. The particular components that perform the various operations of processes 600A and 600B are shown in FIGS. 6A and 6B and are referenced as performing the operations. However, similar methodologies may be applied in other implementations where different components are used to define the structure of the system, or where the functionality is distributed differently among the components shown.

Referring first, to process 600A, an IPAM GUI 601 receives a DHCP scope request (e.g., create scope, update scope, or delete scope) from a user (610). For example, a user (e.g., an administrator) may log into the IDP system by providing credentials to the IPAM GUI 601, which then authenticates the user by communicating with the enterprise directory, as described above. Once authenticated, the user may provide a DHCP scope request to the IPAM GUI 601. The user may provide the request by, for example, manually entering such a request into the IPAM GUI or navigating to a particular portion or page of the IPAM GUI 601.

The IPAM GUI 601 sends the DHCP scope request to an IDP client API 602 (615). The IDP client API 602 is an intermediary between the IPAM GUI 601 and IDP server 603. The IDP client API 602 may be responsible for (i) receiving a DHCP scope request from the IPAM GUI 601 (620), (ii) translating (or converting) the DHCP scope request into IDP (e.g., into a message in an IDP XML-compliant format) (625), and (iii) sending the translated DHCP scope request to the IDP server 603 (630). In some implementations, the IDP client API also may be configured to receive a response from the IDP server 603 and report the response back to the IPAM GUI 601 for display to the user.

The IDP server 603 receives the translated DHCP scope request (e.g., the IDP request) from the IDP client API 602 (635). The IDP server 603 processes the translated request by, for example, determining required changes, if any, to the DHCP server configurations based on the request (603). The IP server 603 updates the configurations of one or more DHCP servers 605 (as shown in FIG. 6B) based on the processing (645). The IDP server 603 provides the updated configurations to CVS 604. The CVS 604 receives the updated configurations form the IDP server 603 (655) and stores the updated configurations (680).

Referring now to process 600B, DHCP servers 605, which may be all of an enterprise's multiple DHCP servers, request their respective current configurations from CVS 604 (665). CVS 604 receives the requests for the current configurations from the DHCP serves 605 (670) and provides the current configurations to the DHCP severs 605 (675). The current configurations provided to the DHCP servers 605 by the CVS 604 are the most recent, updated configurations that were provided to the CVS 604 by the IDP server 603 during, for example, process 600A. The DHCP servers 605 receive the current configurations from the CVS 604 (680) and then restart so that the new configurations may take effect (685).

Figure 7:
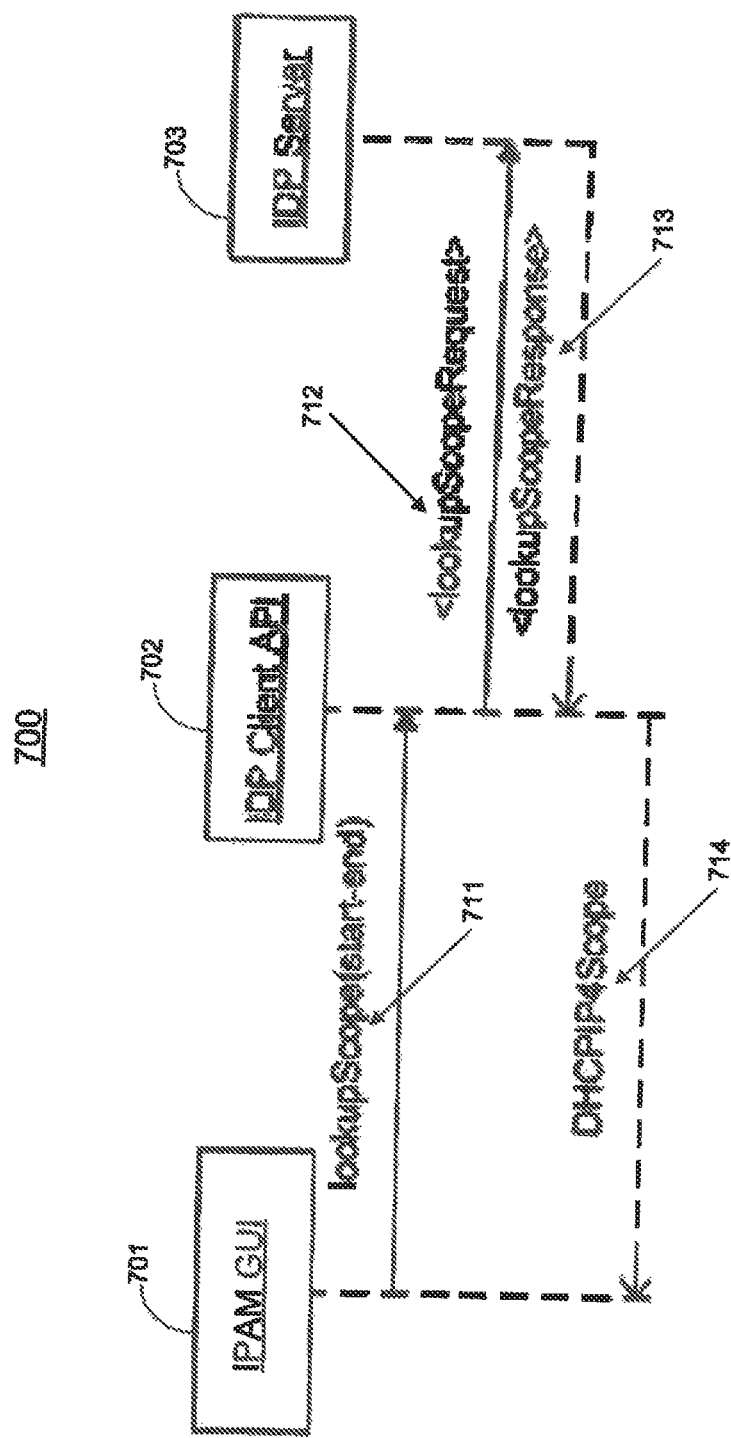
FIG. 7 is a flow chart of a high-level process for retrieving scope information that illustrates the interaction between an IPAM GUI and an IDP server via an DP client API.

FIG. 7 is a flow chart of a high-level process 700 for retrieving scope information using, for example, a lookup scope request. More particularly, process 700 provides a high-level illustration of the interaction between IPAM GUI 701 and IDP server 703 via DP client API 702. Generally, the operations of process 700 may be used in conjunction with the systems and configurations described earlier in, for example, FIGS. 1-5. The particular components that perform the various operations of process 700 are shown in FIG. 7 and are referenced as performing the operations. However, similar methodologies may be applied in other implementations where different components are used to define the structure of the system, or where the functionality is distributed differently among the components shown.

IPAM GUI 701 receives a lookup scope request from a user and sends the lookup scope request to the IDP client API 702 (711). The lookup scope request sent by the IPAM GUI 701 to the IDP client API 702 may include a range of IP addresses (e.g., a start and end) in order to identify the scope in which the user is interested.

In response to receiving the lookup scope request from the IPAM GUI 701, the IDP client API 702 translates the lookup scope request into an IDP scope lookup request. The IDP scope lookup request may include IP address range information in order to identify the scope. The range information may be included in the IDP message based on the lookup scope request received by the IDP client API 702 from the IPAM GUI 701. Once the lookup scope IDP request is generated by the IDP client API 702, the IDP client API 702 transmits the IDP message to the IDP server 703 (712).

The IDP server 703 receives the scope lookup IDP message and looks up the scope identified by the range included in the IDP message. The IDP server 703 then generates a response IDP message, referred to as an IDP response, and transmits the IDP response to the IDP server 703 (713). The IDP response may identify whether the scope exists on the IDP server side, may identify both reserved and dynamically used IP addresses within the scope, and IP addresses that are in use. For the used IP addresses within the scope, the IDP response also may include a MAC address and host name that are associated with the used IP addresses.

The IDP client API 702 receives the IDP response from the IDP server 703 and translates the IDP response into scope information that can be understood by the IPAM GUI 701. The IDP client API 702 then returns the scope information to the IPAM GUI 701 (714) for display to the user.

Figure 8A:
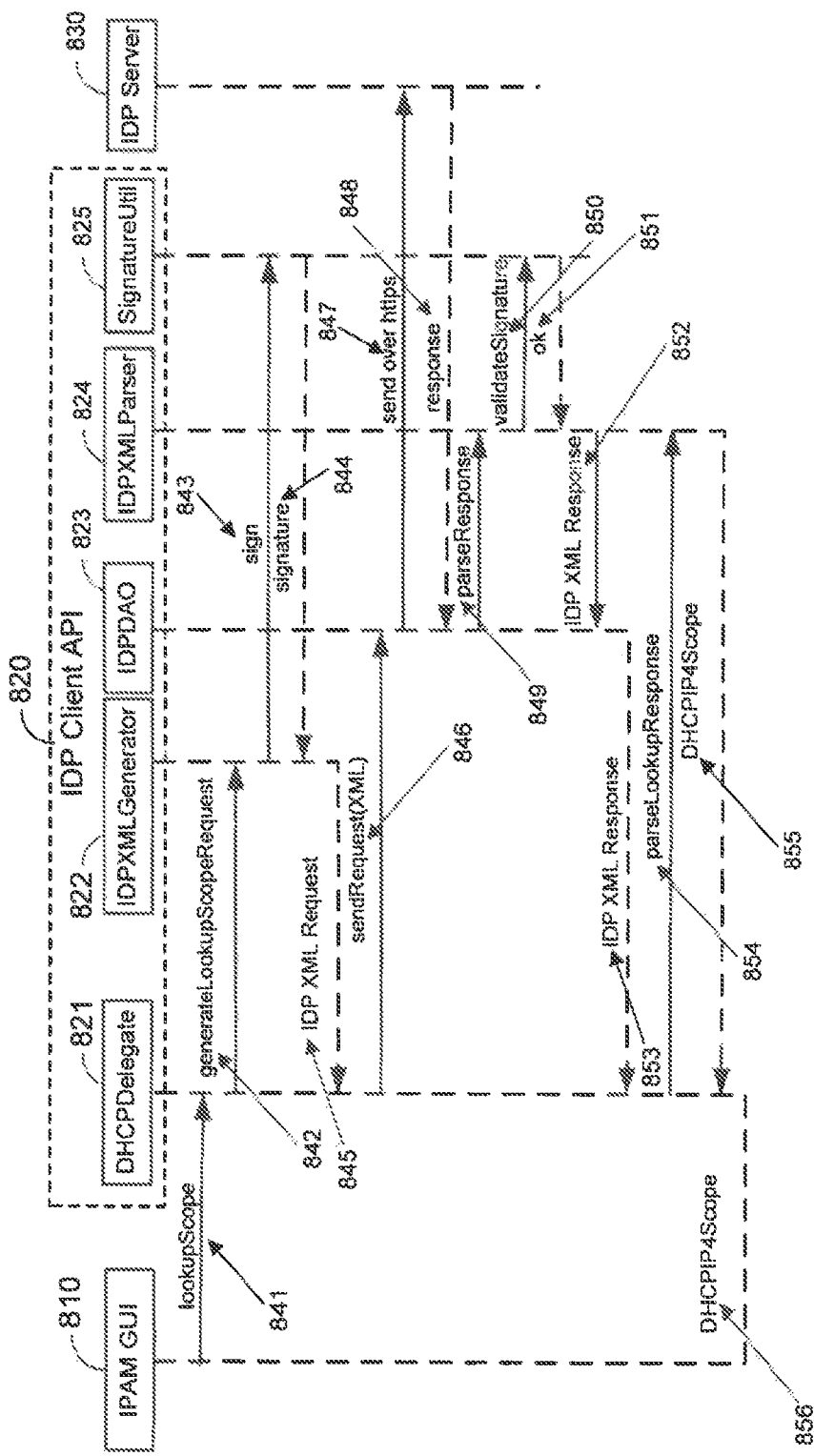
FIG. 8A is a flow chart of one implementation of a detailed process for performing a lookup scope request and FIG. 8B is a flow chart of another implementation of a detailed process for performing a lookup scope request, both of which illustrate the interaction between an IPAM GUI and an IDP server via an IDP client APL
Figure 8B:
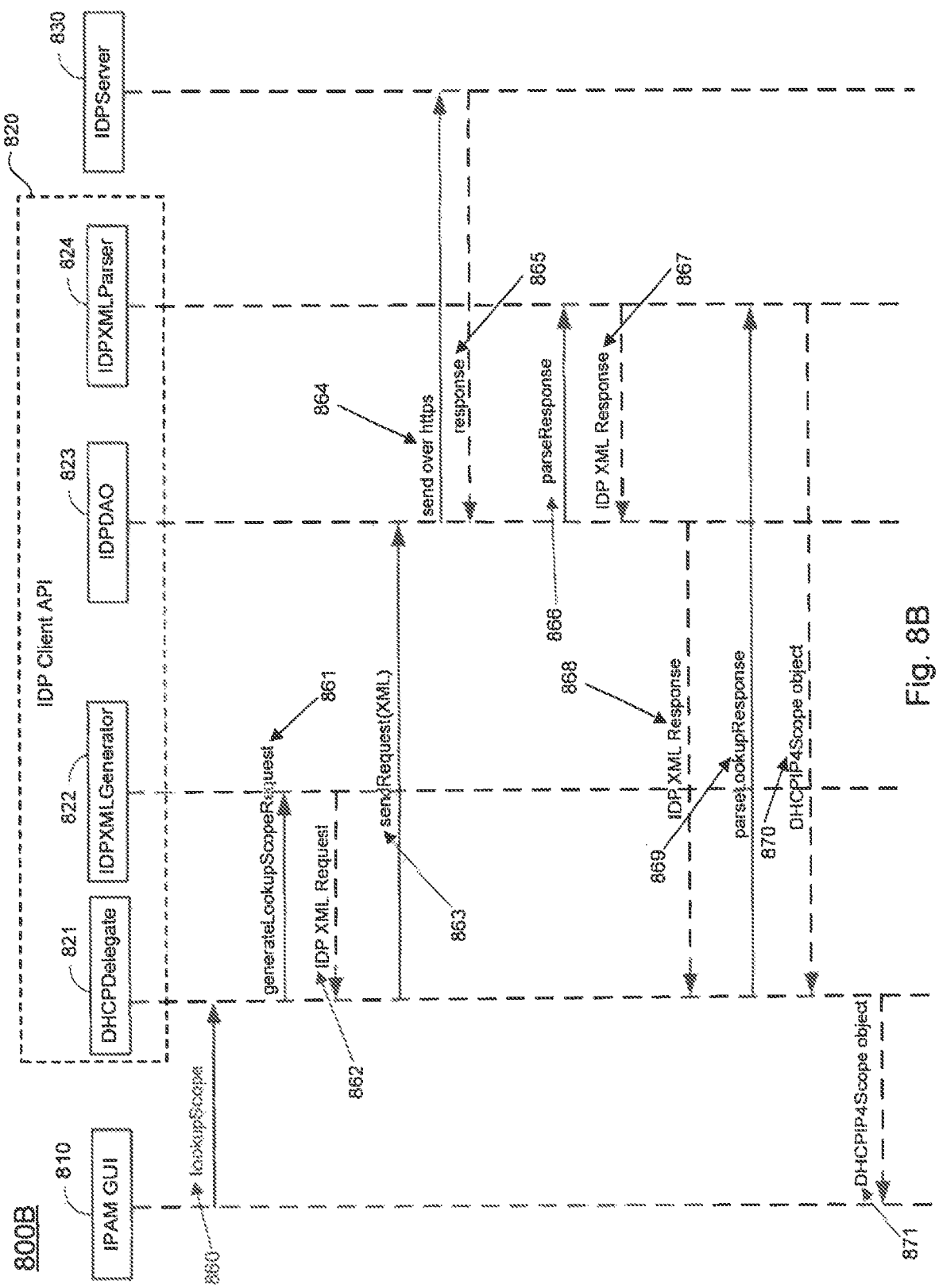

FIG. 8A is a flow chart of an implementation of a detailed process 800A for performing a lookup scope request and FIG. 8B is a flow chart of another implementation of a detailed process 800B for performing a lookup scope request. More particularly, processes 800A and 800B illustrate the interaction between IPAM GUI 701 and DP server 703 via IDP client API 702. Generally, the operations of processes 800A and 800B may be used in conjunction with the systems and configurations described earlier in, for example, FIGS. 1-5. The particular components that perform the various operations of processes 800A and 800B are shown in FIGS. 8A and 8B and are referenced as performing the operations. However, similar methodologies may be applied in other implementations where different components are used to define the structure of the system, or where the functionality is distributed differently among the components shown.

Referring to process 800A, IPAM GUI 810 communicates with IDP server 830 via the IDP client API 820. As shown in FIG. 8A, IDP client API 820 includes multiple components: DHCP Delegate 821, IDP XML Generator 822, IDP Data Access Object (DAO) 823, IDP XML Parser 824, and Signature Utility 825.

For programs that access the IDP client API 820, such as, for example, a Java-based version of IPAM GUI 810, DHCP Delegate 821 may be the point of contact. In other words, the component of the IDP client API 820 that is being accessed when the IPAM GUI 810 contacts the IDP client API 820 is the DHCP Delegate 821. The DHCP Delegate 821 includes information for recognizing each type of request that it may receive from the IPAM GUI 810. As such, IPAM GUI 810 sends a request (e.g., a lookup scope request) (841) to the IDP client API 820 via the DHCP Delegate 821.

The DHCP Delegate 821 recognizes the request (e.g., a lookup scope request) as a particular request type and transmits the request type recognized by the IDP (e.g., lookup scope request) to IDP XML Generator 822 (842).

The IDP XML Generator 822 translates the request into an IDP message (e.g., an IDP-compliant XML message) and sends the IDP message to the Signature Utility 825 (843). The Signature Utility 825 secures the IDP message by appending a signature to the IDP message. For example, the Signature Utility 825 may apply a Pretty Good Privacy (PGP) signature to the request. The Signature Utility 825 transmit the signed IDP message back to the IDP XML Generator 822 (844).

The IDP XML Generator 822 receives the signed DP message from the Signature Utility 825 and sends it to the DHCP Delegate 821 (845). The DHCP Delegate 821 receives the signed IDP message and sends it to the IDP DAO 823 (846).

The IDP DAO 823 handles interaction between the IDP client API 820 and the IDP server 830. As such, the IDP DAO 823M sends the signed IDP message to the IDP server 830 over HTTPS (e.g., an IDP transport substrate) (847). The IDP server 830 receives the signed IDP message, processes the signed IDP message, as described in detail below, and sends a signed response, which is also an XML-compliant DP message, referred to as an IDP response, back to the IDP DAO 823 (848). The IDP response is signed to ensure its security and so that it may be validated by the IDP client API 820 (e.g., the Signature Utility 825) upon receipt from the IDP server 830.

The IDP DAO 823 receives the response from the IDP server 830 and sends the response to the IDP XML Parser 824 for parsing (849). The IDP XML Parser 824 first sends the IDP response to the Signature Utility 825 to validate the signature provided by the IDP server 830 (850). The Signature Utility 825 responds to the IDP XML Parser 824 that the signature is valid (or returns an error) (851).

The IDP XML Parser 824 then forwards the validated IDP response from the IDP server 830 to the IDP DAO 823 (852), which in turn sends it to the DHCP Delegate 821 (853). The DHCP Delegate 821 recognizes the response as being an XML-compliant IDP response and sends the IDP response back to the IDP XML Parser 824 for additional parsing (854).

The IDP XML Parser 824 receives the IDP response and checks the IDP response for errors. Errors may occur during any of the operations of process 800A (or 800B). Errors may be categorized as shown in Table 1.

TABLE 1

| Error Type | Error Example |
| --- | --- |
| Communication Error | Trouble connecting to the IDP server |
| Configuration Error | Non-readable IDP server URL (from the configuration file) |
| Validation Error | IDP response is not valid XML; IDP response is not appropriate for the request |
| Programming Error | Internal state is inconsistent with the expected state |

If no errors are found, the IDP XML Parser 824 converts the IDP response into one or more objects (e.g., Java objects). In this way, the IDP XML Parser 824 performs the opposite function of the IDP XML Generator 822. In some implementations, the IDP XML Parser 824 may parse and convert the IDP response directly after receiving validation of the IDP response from the Signature Utility 825.

The IDP XML Parser 824 sends the response back to the DHCP Delegate 821 (855). The DHCP Delegate 821 provides the converted response, which includes the results of the lookup scope request (e.g., the DHCP IPv4 Scope), to the IPAM GUI 856 for display to the user (856).

As such, process 800A illustrates one implementation where secure transmission of requests between the IDP client API 820 and the IDP server 830 are ensured by signatures. More particularly, process 800A includes the signing of requests, and validation of signed responses received from the IDP server 830, by the Signature Utility 825 within the IDP client API 820.

In another implementation, and as illustrated by process 800B, a one-way certificate may be used to validate requests from the IDP client API 820 to the IDP server 830 (and vice versa) instead of signatures. As such, and as shown in FIG. 8B, Signature Utility 825 may not be included within IDP client API 820.

IPAM GUI 810 communicates with IDP server 830 via the IDP client API 820. Similar to that shown in FIG. 8A, IDP client API 820 of FIG. 8B is made up of various components, including DHCP Delegate 821, IDP XML Generator 822, IDP Data Access Object (DAO) 823, and IDP XML Parser 824.

Again, IPAM GUI 810 sends a request (e.g., a lookup scope request) (860) to the IDP client API 820 via the DHCP Delegate 821. The DHCP Delegate 821 recognizes the request (e.g., a lookup scope request) as a particular request type and transmits the recognized request type (e.g., a lookup scope request) to IDP XML Generator 822 (861).

The IDP XML Generator 822 translates the request into an IDP message (e.g., an IDP-compliant XML message) and sends the IDP message back to the DHCP Delegate 821 (862). The DHCP Delegate 821 is then able to send the IDP message to the IDP DAO 823 (863) for transmission to the IDP server 830 over HTTPS (864).

The IDP server 830 may use Secure Socket Layer (SSL) certificates to authenticate senders. The certificate authority and the certificate serial number used by the IDP client API 820 via the IDP DAO 823 to establish the HTTPS connection may be verified and used to establish access privileges.

The IDP server 830 receives the IDP message over HTTPS, processes the IDP message, as described in detail below, and sends an XML-compliant IDP response back to the IDP client API 820 via the IDP DAO 823 (865).

The IDP DAO 823 receives the IDP response from the IDP server 830 and ends the IDP response to the IDP XML Parser 824 for parsing (866). The IDP XML Parser 824 first checks the IDP response for errors. Errors may occur during my of the operations of process 800B (or 800A). Errors may be categorized as shown in Table 1 above.

If no errors are found, the IDP XML Parser 824 sends the IDP response to the IDP DAO 823 (867), which in turn sands it to the DHCP Delegate 821 (868). The DHCP Delegate 821 recognizes the response as being XML-compliant IDP and sends the IDP response back to the IDP XML Parser 824 for additional parsing (869).

The IDP XML Parser 824 receives the IDP message from the DHCP Delegate 821 and converts the IDP response into one or more objects (e.g., Java objects). In some implementations, the IDP XML Parser 824 may parse and convert the IDP response directly after receiving it from the IDP DAO 823.

The IDP XML Parser 824 sends the response back to the DHCP Delegate 821 (870). The DHCP Delegate 821 provides the converted response, which includes the results of the lookup scope request (e.g., the DHCP IPv4 Scope), to the IPAM GUI 856 for display to the user (871).

Requests other than the scope lookup request illustrated in processes 700, 800A, and 800B may be performed in a manner similar to that shown and described.

A lookup scope request IDP message, as described above with respect to FIGS. 7, 8A, and 8B, is just one type of IDP message that may be generated by the IDP client API 702. Other IDP messages may be generated to perform the following requests: (i) create a scope, (ii) update a scope, (iii) resize a scope, (iv) delete a scope, (v) lookup a scope, (vi) list candidate scope servers, (vii) list all scopes, (viii) create shared network, (ix) update shared network, (x) delete shared network, (xi) lookup shared network, (xii) list all shared networks, (xiii) block MAC address, (xiv) unblock MAC address, (xv) list blocked MAC addresses, and (xvi) is MAC address blocked. All IDP messages may include a client ID attribute that helps identify an IDP client on the IDP server side for authorization purposes. IDP messages used for performing particular requests may include information in addition to the client ID attribute, as described below.

Similarly, IDP responses may be generated in response to each of the IDP requests noted above. All IDP responses may include a result element that details the result of processing a corresponding request (based on the original IDP message) on the IDP server side. The result element may include a code attribute, a message element, and zero or more error value elements. An error value element may identify an invalid data value and provide a reason (e.g., a code) for that error. The error value information may help pinpoint errors in, for example, data provided by the user on the IPAM GUI side.

An IDP message for creating a scope may include elements to specify the scope range, DHCP and DNS server IP addresses, router IP address and netmask, domain name, default lease duration, less common DHCP options, and reserved IP addresses within the scope (including MAC addresses associated with a reserved IP address).

In some implementations, an IDP message for updating a scope may include complete scope information to ensure that the update scope message unequivocally specifies the new state of the scope. Alternatively or additionally, an update scope DP message may include a difference between an existing scope and an updated version of the existing scope. To avoid updating a stale copy of a scope, the IDP client API may first perform a scope lookup (as described in detail above) in order to ensure that the update scope IDP message includes the most recent version of the scope to be updated.

An IDP message for resizing (e.g., expanding or contracting) a scope may be an extension of the update scope IDP message and may include an identifier to the scope that is being resized, an old scope range, a new scope range, and any other scope information that may be changed by the resize scope IDP message.

An IDP message for deleting a scope may include range and version information in order to identify the scope to be deleted. Including the version information may prevent deletion of a stale copy of the scope.

As described above with respect to process 700, an IDP message for looking up a scope may include range information in order to identify the scope in which the user is interested. A response to the lookup scope IDP message may identify whether the scope exists on the IDP server side, may identify both reserved and dynamically used IP addresses within the scope, and IP addresses that we in use. For the used IP addresses within the scope being looked up, the response also may include an associated MAC address and host name. The information about a used IP address may prove useful when tracking a security incident, as described in more detail below.

An IDP message for listing candidate scope servers may be used for a scope that is being created. More particularly, an IDP message may be used to determine which DHCP servers may be available to be included in a new scope that is being created. The IDP message may include a range in order to identify the scope. A response to the list candidate scope server IDP message may include zero or more server elements that specify the candidate DHCP servers for the scope. In some implementations, the IDP client API may override the recommended candidate DHCP servers when assigning DHCP servers to the new scope.

An IDP message for listing all scopes may include only the client ID attribute. A response to the list all scopes IDP message may include zero or more scope elements that identify the scopes within a particular IDP system or being managed by a particular IDP server.

An IDP message for creating a shared network may include a shared network element that specifies a name and list of members for the shared network to be created.

An IDP message for updating a shared network may include a version element (which may help identify a most current version of the shared network to be updated) to ensure that the IDP message unequivocally specifies the new state of the network. In some implementations, the IDP client may send complete shared network information. Alternatively, or additionally, an update shared network IDP message may include a difference between the original version of the scope and the updated version of the scope. In some implementations, and to avoid updating a stale copy of the network entry, the IDP client API may perform a shared network lookup prior to performing the update shared network command, and use the information returned from the lookup command in the update shared network IDP message.

An IDP massage for deleting a shared network may include a name element to identify the network entry to be deleted, as well as information regarding the version of the network in order to prevent deleting a stale copy of the network entry.

An IDP message for looking up a shared network may include a name element to identify the network to be looked up. A response DP message may indicate whether the network entry exists on the IDP server side.

An IDP message for listing all shared networks that a particular IDP server is managing may simply include the client ID attribute to identify the particular IDP sever. A response IDP message may include zero or more shared network elements that respond to the shared networks managed by the particular DP server.

An IDP message for blocking a MAC address (the functionality of which is described in detail below) may include a MAC address-to-block element that specifies the MAC address to be blocked and a comment regarding, for example, the reason for blocking the MAC address or other information that may be useful to future users.

An IDP message for unblocking a MAC address may include a MAC address-to-unblock element that specifies the blocked MAC address and a comment that includes, for example, a reason for unblocking the MAC address.

An IDP message for listing MAC addresses that are managed by a particular IDP server and that have been blocked may include the client ID attribute to identify the particular IDP server. A response IDP message may include zero or more blocked MAC address elements that specify the blocked MAC addresses and, for each, a comment (e.g., a reason for blocking the MAC address), an identifier specifying who requested the block, and an indication of when the MAC address was blocked.

An IDP message for determining whether a MAC address has been blocked may include a MAC address in which the user is interested. A response IDP message may include elements that specify the MAC address and a flag to indicate the blocked/unblocked status of the MAC address. If the MAC address is blocked, the response also may include comment, requester, and time of blocking information.

Figure 9:
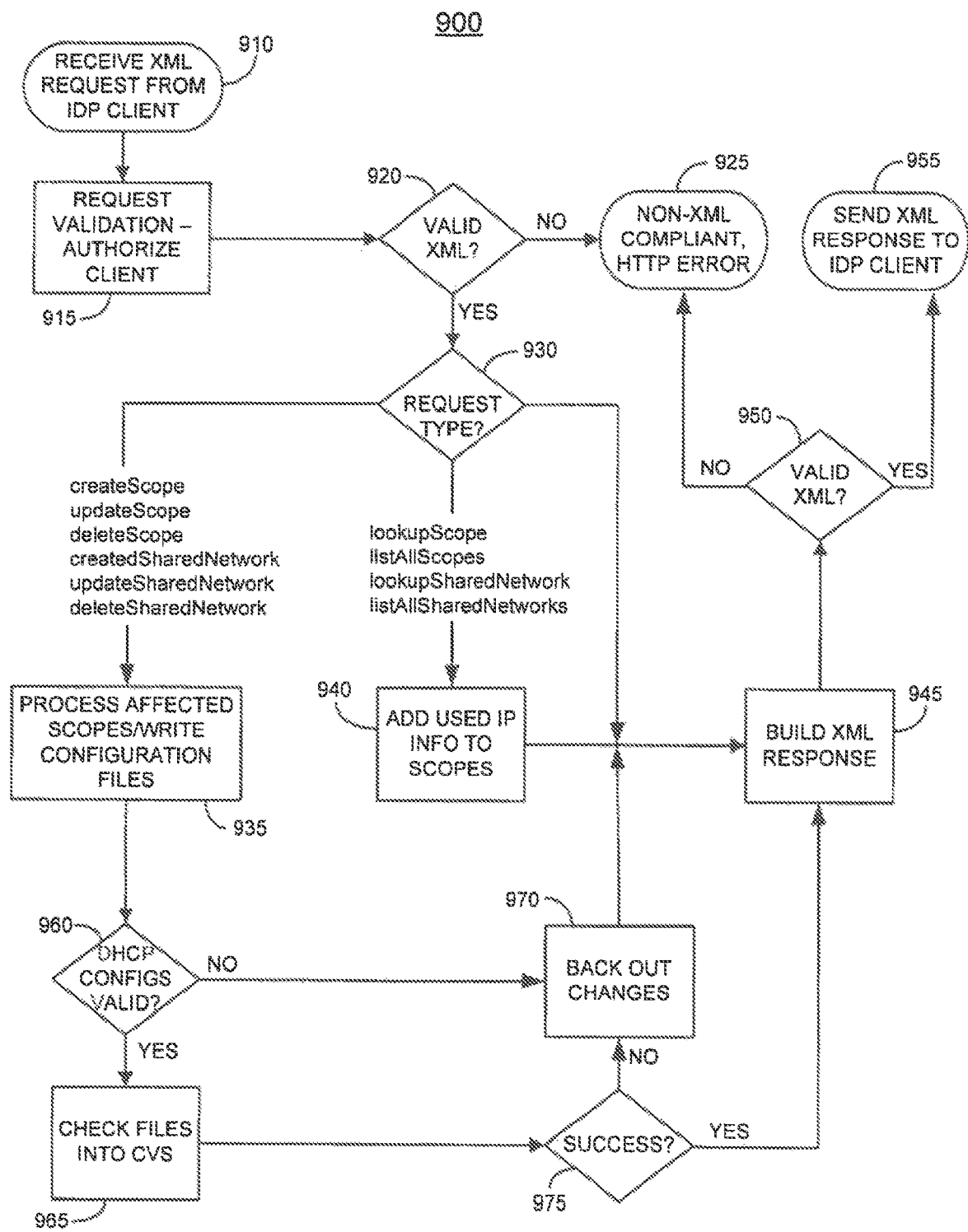
FIG. 9 is a flow chart of an example of a process for handling IDP requests, which operations are performed by an IDP server

FIG. 9 is a flow chart of an example of a process 900 for handling IDP requests. Generally, the operations of process 900 may be used in conjunction with the systems and configurations described earlier in, for example, FIGS. 1-5. More particularly, process 900 provides an illustration of the processing that is performed by an IDP server, when handling an IDP request and the IDP server will be referenced as performing the operations of process 900. However, similar methodologies may be applied in other implementations where different components are used to define the structure of the system, or where the functionality is distributed differently among the components shown.

As described above, the IDP server is responsible for receiving updates to DHCP server configurations from IPAM and persisting the configurations in the CVS, as well as providing information about current configurations. In some implementations, the IDP server may be implemented in Perl. The IDP server may interact with the IPAM GUI as described above with respect to FIGS. 7, 8A, and 8B.

The IDP server receives an XML-compliant IDP request from the IDP client API (910). For example, the IDP server receives a scope lookup request from the IDP client API.

The IDP server requests XML validation and verifies the authorization of the IDP client API from which the IDP request was received (915). In one implementation, the IDP server may verify a Pretty Good Privacy (POP) signature of the request (which was applied to the request by the Signature Utility 825 of FIG. 8A) to verify the authorization of the IDP client API and determine its privileges (e.g., read-only or read and write) with respect to the DHCP configurations controlled by the IDP server. In another implementation, the IDP server may use SSL certificates to verify authority. The certificate authority and the certificate serial number used to establish the HTTPS connection may be verified and used to establish access privileges, as described above with respect to FIG. 8B. Regardless of the type of security attached to the IDP request, and in one implementation, the IDP server may validate the request using the Xerces Per XML parser (see, e.g., http://xml.apache.org/xerces-p).

The IDP server determines whether the request is valid (920). If the request is valid, processing continues to operation 930, as described below. If the request is invalid, the IDP server returns an HTTP error (e.g., "Non-XML Compliant") to the IDP client API (925).

If the request is valid, the IDP server determines the request type (930). Request types may include any of the IDP message types described above, such as, for example, requests related to DHCP scopes, requests related to shared networks, and requests related to blacklisting MAC addresses. The request types may be placed into two categories: (1) informational requests (e.g., lookup and list all requests for scopes and shared networks; status and list all requests for MAC addresses) and (2) action requests (e.g., create, update, and delete requests for scopes and shared networks; block and unblock requests for MAC addresses).

For informational requests (e.g., a lookup scope request), the IDP server may determine that the request is an information request and add used IP addresses (based on the range of IP addresses included in the request) to the scopes (940). Based on the determined used IP addresses, the IDP server builds an XML-compliant IDP response (945) which lists the used IP addresses (and/or scopes) that are relevant to the request. More particularly, for a lookup scope request and a list all scopes request, the IDP server may gather the used IP addresses within each scope and return them to the client along with basic scope information. For a lookup shared network request and a list all shared networks request, the IDP server may gather shared network information (e.g., IP addresses associated with the shared network) and return them to the client along with basic shared network information.

For action requests (e.g., a create scope request), the IDP server may determine that the request is an action request and process the affected scopes (e.g., process scopes to be created, deleted, or updated) and write the corresponding configuration files as appropriate (935). More particularly, for a create scope request, an update scope request, a delete scope request, a create shared network request, an updated shared network request, a delete shared network request, a block MAC address request, or an unblock MAC address request, the IDP server may generate new DHCP (or shared network) configuration files and run them through a local DHCP server to test for syntax and semantic errors.

Based on the changes performed in operation 935, the IDP server determines whether the (new, updated, or deleted) DHCP configurations are valid (960). If the DHCP configurations are not valid, the IDP server backs out of the changes and aborts the request processing (970). Based on the determination that the DHCP configurations are invalid, the IDP server builds an XML-compliant IDP response that indicates that the changes were not made due to invalid resulting DHCP configurations (945).

If the DHCP configurations are valid, the new DHCP configurations are checked into CVS (965). Upon checking the new DHCP configurations into CVS, a unique request identification number is logged with the change. The unique request identification number may help correlate each request to a specific version of the DHCP configuration files in the CVS. Thus, if an error is encountered during any stage of processing or otherwise, the DHCP servers may simply roll back to the previous valid set of configuration files, thereby enabling the DHCP servers to continue running while an administrator investigates the problem.

The IDP server determines whether the new DHCP configurations have been successfully checked into the CVS (975). If the changes were not successfully checked into CVS, the IDP server backs out of the changes and aborts the request processing (970). Based on the determination that the changes were not successful, the IDP server builds an XML-compliant IDP response that indicates that the changes were not made due to an inability to successfully check the new DHCP configurations into CVS (945). If the changes are successfully checked into CVS, the IDP server builds an XML-compliant DP response that indicates that the new DHCP configurations were successfully checked into CVS (945).

Once the IDP server has built an IDP response (in any of the scenarios described above), the IDP server determines if the IDP response includes valid XML (950). If the IDP response does not include valid XML, the IDP server sends an HTTP error (e.g., "Non-Compliant XML") back to the IDP client API (925). If the IDP response is valid XML, the IDP response is authenticated (e.g., the response is PGP-signed) and sent to the IDP client API (955).

As described above, the IDP system may enable communication between an enterprise's IPAM system and DHCP system. Therefore, the entire DHCP system can be managed through an IPAM interface (e.g., IPAM GUI) leading to a holistic approach to the management of the enterprise's IP address space. More particularly, IDP may enable the development of an overall picture of how the IP address space is being allocated and used within the DHCP system. Based on such a holistic view of the enterprise's IP address space, new security functionality may be enabled. For example, an administrator may block a particular user (e.g., a hacker) who is engaging in undesirable activities within the enterprise's IP address pace from being allocated an IP address by any of the enterprise's DHCP servers. More particularly, the administrator may block the user without having to blacklist the user from each individual DHCP server on a server-by-server basis. This approach may be referred to as "one-click blacklisting."

Figure 10:
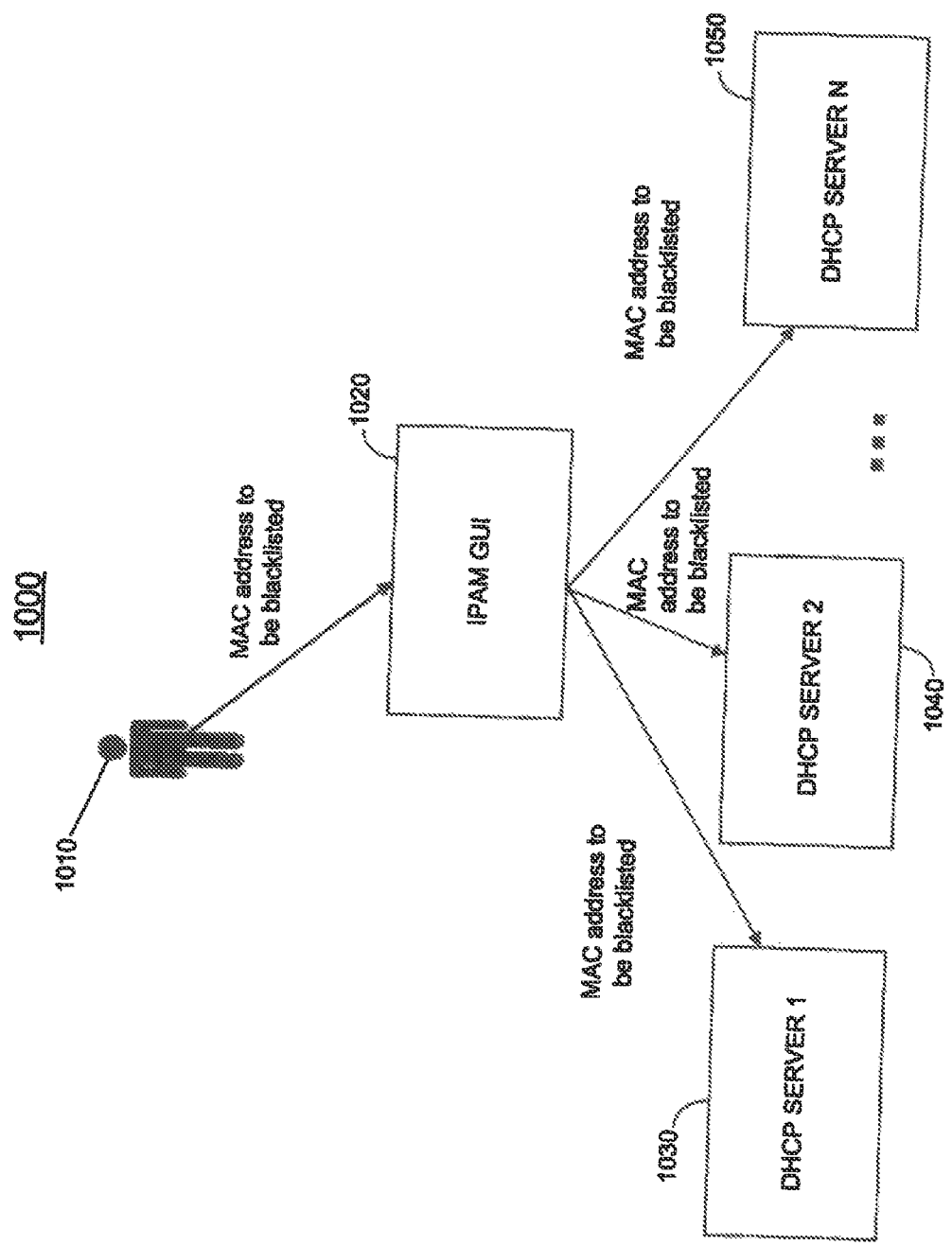
FIG. 10 is a block diagram that illustrates a process for one-click blacklisting.

FIG. 10 is a block diagram 1000 that illustrates a process for one-click blacklisting. An administrator 1010 determines that it would be desirable, for security purposes, to block a machine with a particular MAC address from the entirety of an enterprise's infrastructure. More particularly, the administrator 1010 may wish to prevent the machine from being allocated an IP address by any of the enterprise's DHCP servers, and thus prevent a hacker from connecting to the network with the machine. The administrator 1010 may determine a MAC address associated with the machine based on the hacker's undesirable activities with the machine. The administrator 1010 may request that the machine be blacklisted from the enterprise's infrastructure, and provide the corresponding MAC address, via the IPAM GUI 1020. The IPAM GUI may automatically provide the MAC address to be blacklisted (e.g., the hacker's MAC address) to each and every DHCP server within the enterprise's infrastructure. As shown, and in an enterprise having N DHCP servers, the IPAM GUI provides the MAC address to be blocked to DHCP server 1 1030, DHCP server 2 1040, all the way through to the last DHCP server in the infrastructure, DHCP server N 1050.

More particularly, and in some implementations, the IPAM GUI 1020 may generate a block MAC address request, which includes the MAC address to be blocked and send the request to the IDP server via the IDP client API, as described in detail above. The IDP client API may translate the request into an XML-compliant IDP request and send the IDP request to the IDP server. The IDP server may process the request by, for example, blocking (e.g., deleting) the offending MAC address from the list of MAC addresses to which the DHCP servers in the enterprise may provide an IP address. Assuming successful processing, the IDP server may send an IDP response back to the IDP client API, which may parse the response and send it back to the IPAM GUI 1020 for display to the administrator 1010. The administrator 1010 may receive confirmation that the MAC address has been blocked from being allocated an IP address from any DHCP server within the enterprise's infrastructure.

FIGS. 11-14 are illustrations of various graphical user interfaces (GUIs) 1100-1400 that may be presented to a user as part of the IPAM GUI.

FIG. 11 is an illustration of a DHCP scope detail page 1100. A user may be presented with page 1100 in response to, for example, a request to view details of a particular DHCP scope, by clicking on a hyperlink associated with a particular DHCP scope, or otherwise. In some implementations, the user may be presented with the DHCP scope detail page 1100 in response to a request to create a new DHCP scope (e.g., within an allocated or assigned parent IP address block).

The DHCP scope detail page 1100 may include all available information about a particular DHCP scope. As shown, the name 1101 of the DHCP scope being displayed in DHCP scope detail page 100 is 10.8.4.10-10.8.4.11, which indicates that the scope is for the range of IP addresses between 10.8.4.10 and 10.8.4.11. A description 1102 of the DHCP scope is also shown as Example DHCP scope. Other identifying information regarding the DHCP scope is shown in the DHCP scope detail page 1100 and includes the DHCP server IPs 1103 (10.169.142.90), DNS server IPs 1104 (10.1.1.1), Router IP 1105 (10.8.4.10), Router IP 1105 (10.8.4.10), Router Netmask 1106 (255.255.255.0), Domain Name 1107 (a.com) and Lease Duration 1108 (12345).

Other information regarding the DHCP scope, such as DHCP options 1108, where a user may provide additional information or select particular options for the DHCP scope, are also provided in the DHCP scope detail page 1100.

The IP addresses 1110 within the scope may be displayed with relevant information, such as, for example, whether the IP address is reserved or available. If an IP address is reserved, the IPAM GUI may display the MAC address to which the reserved IP address is associated, a description of the reserved IP address, an identifier for a contact associated with the reserved IP address, and a host name for the reserved IP address, all within the DHCP scope detail page 1100.

In some implementations, the information regarding a reserved IP address may be read-only in the general IPAM GUI page; however, the same information may be managed by a user from the DHCP cope detail page 1100. In other words, a user may not be able to edit or otherwise manage the reserved IP address information until the user accesses and views the DHCP scope detail page 1100 for the DHCP scope to which the reserved IP address belongs. This restriction may ensure that a user can only make significant changes after viewing the full context of a DHCP scope of interest, rather than just viewing the basic information provided by the general IPAM GUI page.

Other information about the DHCP scope, including DHCP scope owners 1111 (Group X), contacts associated with the DHCP scope 1112 (Group X), and change information 1113 (12/10/0412:13 AM: User 1) also may appear in the DHCP scope detail page 1100, as well as location information that identifies the physical location 1114 of a server or other hardware that hosts the IP addresses within the DHCP scopes (Building 1, which is located across from the cafeteria).

After viewing and/or making changes to the DHCP scope, a user may select save button 1115 to accept and save any changes made, cancel button 1116 to cancel any changes made, or delete button 1117 to delete the scope.

Upon selecting the save button 1115, the DHCP scope, as currently displayed in the DHCP scope detail page 1100, may be created or updated in the IPAM database and on the IDP server side. These actions may be considered atomic transactions in that if the operation fails on the IDP server side, the updates in the IPAM database may be rolled back. Furthermore, after every write operation, the scope information on the authoritative IDP server side may be looked up to reconcile the IPAM database with the IDP server side before the next display of the DHCP scope in the DHCP scope detail page 1100.

Figure 12:
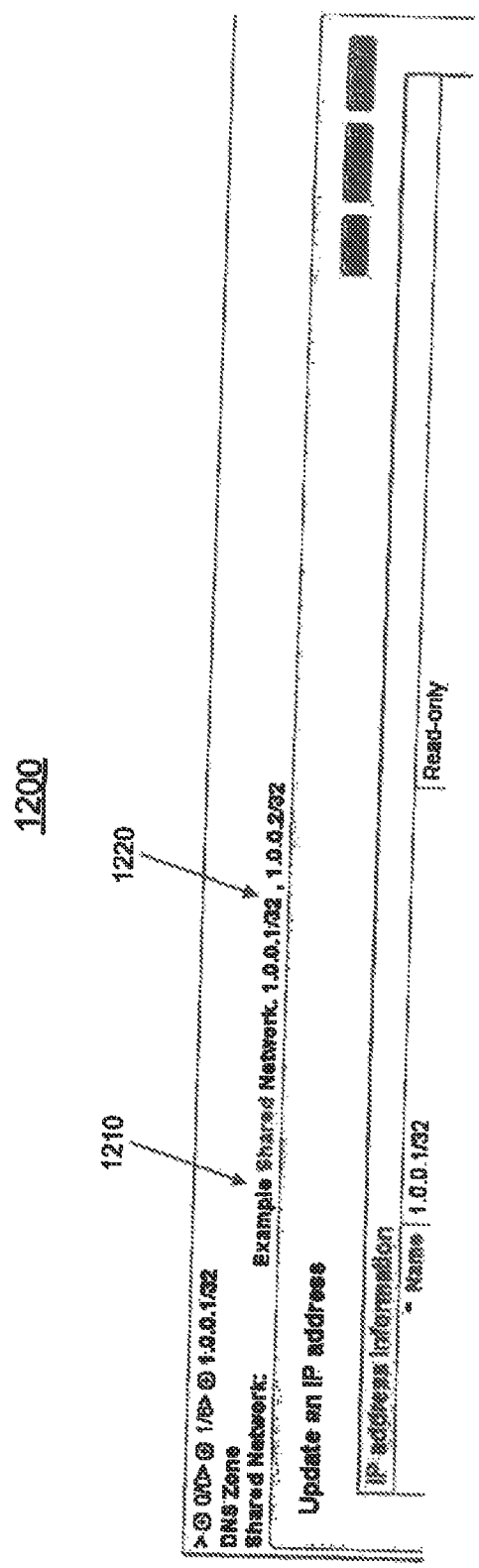

If the DHCP scope displayed in DHCP scope detail page 1100 is part of a shared network, a summary of the shared network may be presented at the top of the DHCP scope detail page. FIG. 12 is an illustration of a summary 1200 of a shared network to which a particular DHCP scope (or IP address) belongs.

The shared network summary 1200 may include the name 1210 (Example Shared Network) of the shared network. The shared network summary 1200 also may include IP addresses 1220 (1.0.0.1/32, 1.0.0.2/32) that are within the shared network. All IP addresses within the shared network may be displayed even if the DHCP scope detail page or an IP address information page (at the top of which the summary is displayed) only provides information for less than all of the IP addresses within the shared network.

FIG. 13 is an illustration of a shared network management page 1300 that displays information about a shared network. A shared network may also be referred to as a hubbed network. Hubs may be used to connect segments of a LAN. When information arrives at one port, the information is copied to the other ports so that all segments of the LAN can see all information, and thus, the information is shared among the ports.

A shared network may include a group of IP addresses, which may be viewed and managed in the shared network management page 1300. A user may access the shared network management page 1300 by selecting, for example, a groups management interface item (e.g., button or hyperlink) from the IPAM GUI main page or otherwise.

The shared network management page 1300 displays the name of the shared network 1310 (Example Shared Network), a description 1320 of the shared network and any additional information 1330 about the shared network, such as, for example, information provided by the user who created or updated the shared network. The shared network management page 1300 also displays information about the owners 1340 of the shared network and any requirements placed on the owners of the shared network.

Additionally, the shared network management page 1300 includes information about the members 1350 of the shared network. As shown, the members include two networks designated by 1.0.0.1/32 and 1.0.0.2/32. The member information also includes validation rules associated with the shared network, such as, for example, (1) the shared network may have two members, (2) members can only be part of one shared network, (3) scopes cannot be directly part of a shared network, but rather may only be part of a shared network through the scope's parent network, and (4) parent and child networks may not be part of the same shared network.

Similar to the DHCP scope detail page 1100 of FIG. 11, the shared network management page 1300 includes a save button 1360, a cancel button 1370, and a delete button 1380, selection of which by a user may cause any changes to the shared network to be saved or cancelled, or the shared network to be deleted, respectively.

FIG. 14 is an illustration of a one-click blacklisting page 1400. A user may access the one-click blacklisting page 1400 by selecting, for example, a blacklisting interface item (e.g., button or hyperlink) from the IPAM GUI main page or otherwise.

As described above, for security purposes, an administrator may seek to block a particular MAC address from being allocated an IP address from any DHCP server within an enterprise. To do so, the user may enter the MAC address to be blocked into the on-click blacklisting page 1400. As shown at 1410*a*, a MAC address (a:bb:cc:dd:ee:ff) has been added to the blacklist. An administrator also may enter comments 1410*b* regarding the blacklisting such as, for example, the reason for the blacklisting or an indication of when the blacklisting should expire.

Once the MAC address to be blocked has been supplied by the administrator, and block button 1420 selected, the IPAM GUI may send the MAC address to the IDP server (via the IDP client API), which may, in turn, update the configurations of all DHCP serves within the enterprise, informing them not to allocate an IP address to the MAC address to be blocked, and persist them in CVS.

An administrator also may use the one-click blacklisting page 1400 to determine whether a particular MAC address is, or is not, blocked. To do so, the administrator may enter a particular MAC address of interest, as well as comment and date information into search block 1430 and select search button 1440. Search results block 1450 may display any MAC addresses that match the MAC address of interest and the status of those MAC addresses as blocked or unblocked.

The administrator also may change the status of a particular MAC address by selecting the particular MAC address from the search results block 1450 and then select the unblock selected button 1460, to unblock the MAC address. If an administrator opts to unblock a particular MAC address, the IPAM GUI may send the MAC address to be unblocked to the IDP server (via the IDP client API), which may, in turn, update the configuration of all DHCP servers within de enterprise, informing them that they may now allocate an IP address to the MAC address to be unblocked, and persisting them in the CVS.

Additionally, a user may select the select all button 1470 to select all MAC addresses displayed in the search result block 1450, the select none button 1480 to unselect all MAC addresses displayed in the search result block 1450, or the close button 1490 to close the one-click blacklisting page 1400.

Lightweight DNS Management Protocol

As described above, and in general, there may be at least three technologies involved in managing IP address space: (1) DHCP; (2) DNS; and (3) IPAM. IDP, also as described above, provides a mechanism for communication between IPAM and DHCP. However, in some implementations, IDP may not address communication between all three components. Therefore, like IDP, an additional Extensible Markup Language (XML) protocol may be configured to provide an implementation-independent (or implementation-agnostic) mechanism for managing DNS configurations. More particularly, the XML protocol may be configured to enable communication among IPAM and DHCP and a service controlling all (or a subset) of DNS zone configurations within an enterprise. Doing so may provide an even greater holistic approach (and, in some instances, loosely-coupled) to the management of an IP address space by allowing both forward and reverse DNS zone management directly from IPAM. The additional XML protocol may be referred to as LDMP, which stands for Lightweight DNS Management Protocol.

DNS, or Domain Name server (or System), acts as a "phone book" by translating human-readable-computer domain names, or host names (e.g.), into an IP address (e.g., 100.10.10.0) that identifies a computer that is storing the information associated with the domain name (e.g., a server that stores the webpage displayed at www.aol.com. A zone is a portion of an enterprise's global DNS namespace and may include multiple domain names.

Similar to IDP, LDMP may be generic enough to enable communication with any DNS server implementations that currently exist or may be forthcoming in the future. In one example, LDMP is configured to enable communication with ISC DNS servers. ISC stands for Internet Software Consortium, which is an organization that provides open source DHCP and DNS products.

In one implementation, to reserve, unreserve, or lookup a zone, an administrator may submit a relevant request to a DNS GUI. The DNS GUI may be a portion of, or associated with, the IPAM GUI described above, or may be a stand-alone GUI application. The DNS GUI may consequentially send a zone request to a translation service referred to as an DNS Web Service client Application Program Interface (API). The DNS Web Service client API is an intermediary between the DNS GUI and a DNS configuration service, referred to as a DNS Web Service (or DNS management server). The DNS Web Service client API may be responsible for converting, or translating, a request received by the DNS Web Service client API from the DNS GUI (initiated by an administrator) into an LDMP XML-compliant message. Such translation may be used in implementations in which the DNS GUI provides the request to the DNS Web Service client API in some other format, such as, for example, in Hypertext Markup Language (HTML) or as a Java object. The Web Service client API also may be responsible for providing the LDMP message to the DNS Web Service, and reporting back the DNS Web Service response to the DNS GUI for display to the administrator.

Upon receiving the LDMP message, the DNS Web Service may update the configurations of all of the DNS servers in the infrastructure that are associated with the zone identified in the request and persist the updated configurations in a Database for DNS (DBDNS). The DBDNS may be used to store DNS server configurations and allow each DNS server to periodically (e.g., at a predetermined time or upon the occurrence of a particular event) read its new configuration from the DBDNS and restart. As such, the DNS Web Service may identify the DNS servers that are associated with a scope by, for example, querying the configurations stored in the DBDNS for those that are associated with the zone. The DBDNS also may enable data backup and recovery of the DNS server configurations.

The DNS Web Service also may regularly receive lease information from the enterprise's DHCP servers to help create a comprehensive picture of a zone (including dynamically used IP addresses, as well as the reserved IP addresses). Thus, an administrator viewing the enterprise's IP address space from the DNS GUI side may receive a more holistic view of the infrastructure.

In some implementations, LDMP may implement a "push now" feature that is configured to advise the DNS Web Service that a change (initiated, for example, by a user via the DNS GUI) may be provided (or "pushed") to an enterprise's DNS servers immediately. Such a feature enables changes to DNS to be implemented in a timely fashion, rather than simply enabling changes to be cached and applied to the DNS servers at a pre-determined time, e.g., a time that may cause a delay that is harmful to the enterprise's IP address namespace.

Figure 15:
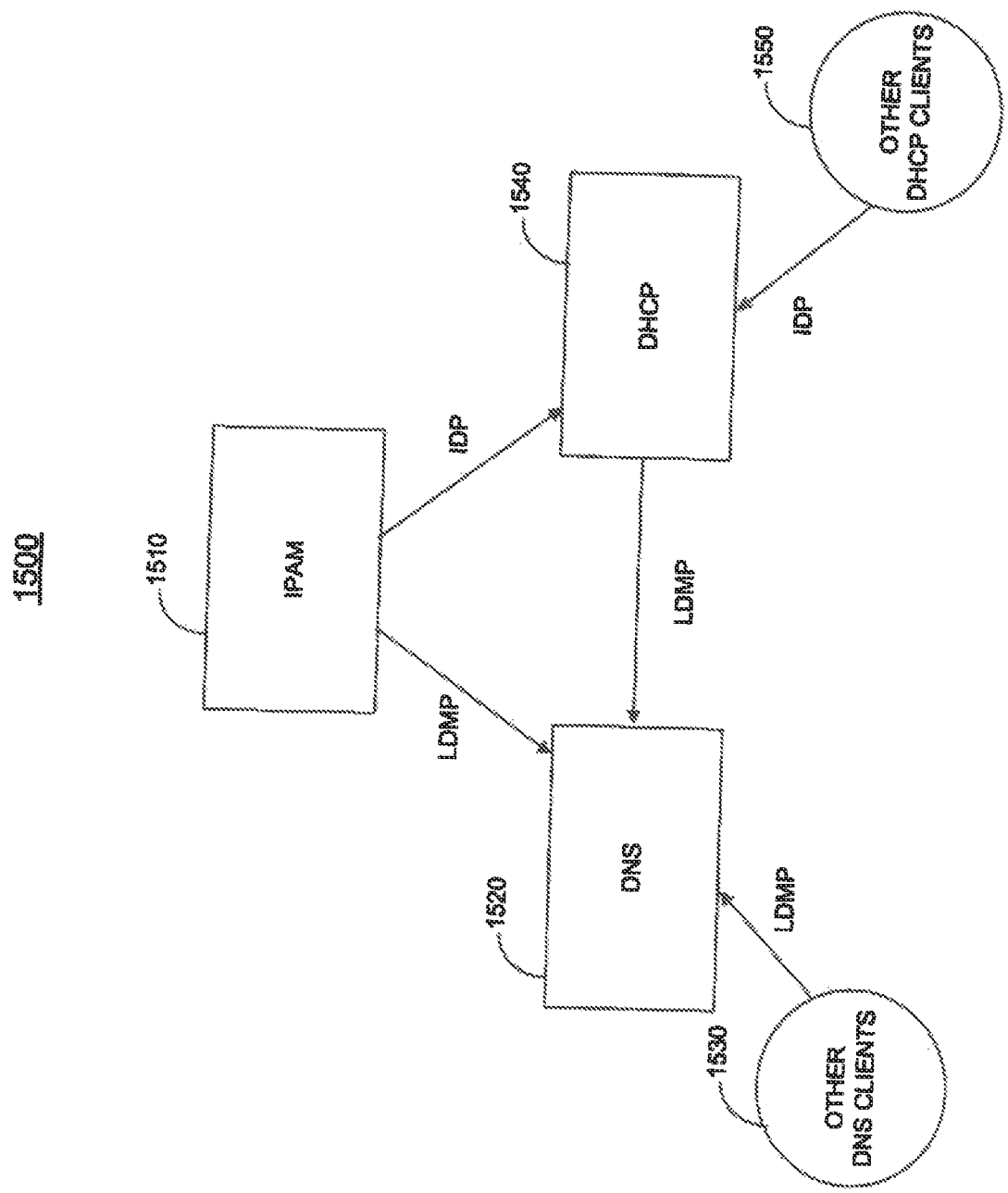
FIG. 15 is a block diagram that represents an example of the interaction between IPAM, DNS, and DHCP services.

FIG. 15 is a block diagram 1500 that represents an example of the interaction between IPAM 1510, DNS 1520, and DHCP 1540. As described above, a user may manage an enterprise's DHCP service via an IPAM GUI. This interaction is shown as IPAM 1510 interacting with DHCP 1540 via IDP. Additionally, Other DHCP clients 1550 also may interact with DHCP 1540 via DP. Other DHCP clients 1550 may include, for example, an IP information service that may be configured to identify an owner of an IP address that is associated with a particular security incident. The IP information service may identify the owner by contacting DHCP 1540 via IDP.

IPAM 1510 may communicate with an enterprise's DNS service, identified as DNS 1520 via LDMP in a manner similar to communications between IPAM 1510 and DHCP 1540 via IDP, a detailed description of which is provided below. For example, if a network, having a particular name, has been added to IPAM, IPAM 1510 may communicate with DNS 1520 via LDMP to initiate the creation of a reverse zone, i.e., a mapping between an IP address associated with the network and the particular name for the network. Upon receipt of the initiation request at DNS 1520, the reverse zone may be created.

DHCP 1540 also may communicate directly with DNS 1520 via LDMP. For example, if a change has been made to a scope within the enterprise's DHCP servers that affects DNS (e.g., the new scope affects a host reservation), DHCP 1540 may provide a message regarding the change to DNS 1520. To do so, DHCP 1540 may send the message to the IDP server described above for translation into LDMP (e.g., in a fashion similar to the configuration of the IDP server that enables it to translate messages into IDP). Once translated, the LDMP message may be sent from DHCP 1540 to DNS 1520 via LDMP.

Additionally, and in some implementations, other DNS clients 1530 also may communicate with DNS 1520 via LDMP. The other DNS clients 1530 may include, for example, a host-provisioning tool for a particular, or several, specialized systems (e.g., a development and testing system). The host-provisioning tool may be configured to allocate a host to the specialized system and then register the host in DNS 1520 via LDMP. In this example, because the specialized system may not be implemented for use across the enterprise's IP namespace, the host registered in DNS 1520 by the host-provisioning tool may not be identified in DHCP or IPAM.

Figure 16:
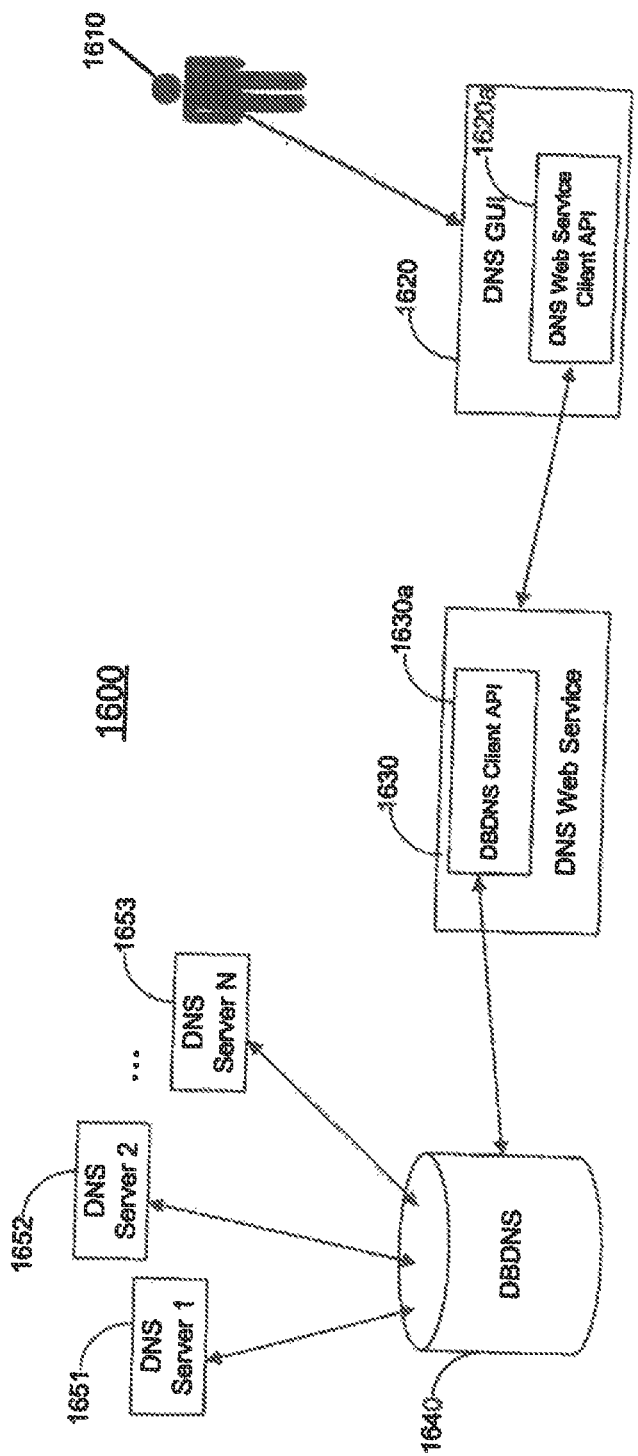
FIG. 16 is a block diagram that represents an example of a logical view of the architecture of DNS.

FIG. 16 is a block diagram 1600 that represents an example of a logical view of the architecture of DNS 1520. In general, DNS 1520 includes three components: (1) a GUI, represented by DNS GUI 1620; (2), a service layer, represented by DNS Web Service 1630; and (3) a database, represented by DBDNS 1640.

Block diagram 1600 includes a user 1610. Similar to the block diagrams described above, user 1610 may be an administrator authorized to perform various operations by interacting with the DNS GUI 1620. User 1610 may access the DNS GUI 1620 through, for example, a web application referred to as a directory management tool (DMT) via an enterprise's secure Extranet, a secure Internet web page, or a dedicated application that enables secure web access.

In some implementations, DNS GUI 1620 is a GUI separate and distinct from the IPAM GUI described in detail above. Alternatively, DNS GUI 1620 may be implemented as a portion of an IPAM GUI or may be associated with the IPAM GUI in some manner. For example an IPAM GUI may include a DNS GUI subsection or subpage. In another example, a general Enterprise Namespace Management GUI may include an IPAM subsection and a DNS subsection.

For example, user 1610 may seek to create a host reservation in DNS 1520. To do so, the user 1610 may provide a new host reservation request to DNS GUI 1620. More particularly, user 1610 may retrieve a DHCP scope and other information from IPAM and provide the DHCP scope, along with information associated with the new host (e.g., IP address and MAC address) to DNS GUI 1620.

DNS GUI 1620 may provide the now host reservation request (including the DHCP scope, IP address, and MAC address associated with the new host) to DNS Web Service 1630. More particularly, DNS GUI 1620 may provide the new host reservation request to DNS Web Service client API 1620a, which communicates with DNS Web Service 1630 via LDMP.

Upon receipt of the new host reservation request, DNS Web Service 1630 provides the request to DBDNS 1640. More particularly, DNS Web Service 1630 may communicate with DBDNS client API 1630a to send the new host reservation request to DBDNS 1640. In some implementations, DBDNS client API 1630 interacts with DBDNS 1640 using a protocol other than LDMP.

DBDNS 1640 may be considered a staging area for DNS server configurations in a manner similar to the functionality of the CVS for DHCP server configurations described above. As such, DBDNS 1640 may reserve the new host as per the request and update various DNS server configurations based on the new reservation. The DBDNS 1640 also may store the updated configurations (and, in some implementations, the provided information associated with the new host reservation request) until such time as the DNS servers pick up their new configurations at the next update interval. The DNS servers are represented in block diagram 1600 by DNS server 11651, DNS server 2 1652, and DNS server N 1653, where N is the total number of DNS servers within the enterprise. Similar to the DHCP server described above, DNS servers 1651-1653 may load their updated configurations at predetermined time intervals, such as, for example, every hour. Additionally, or alternatively, the DBDNS 1640 may actively push the updated configurations to the DNS servers 1651-1653 at the appropriate time.

As mentioned above, DNS 1520 also provides the ability for "push now" functionality. If the changes associated with reserving the new host need to take affect without delay (e.g., immediately), the user 1610 may indicate that the request should be associated with a "push now" command. As such, an indication (e.g., a bit or flag) may be associated with the request indicating that it should be implemented under the "push now" functionality. Thus, if a particular request includes a "push now" indication, upon receipt of the particular request, DBDNS 1640 may notify the DNS servers 1651-1653 that their configurations have been updated and the updated configurations should be loaded without delay, rather than waiting for the next update interval.

Figure 17:
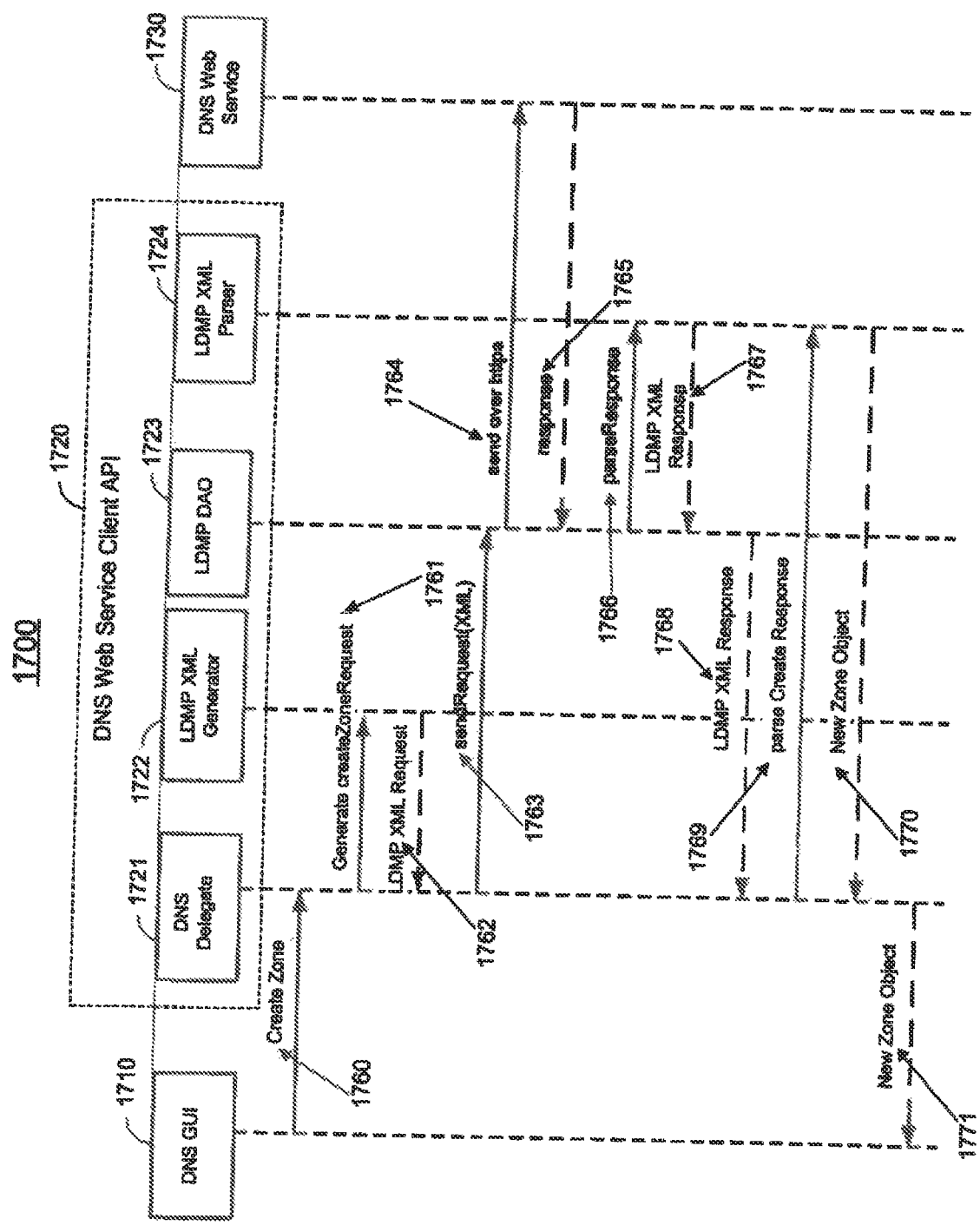
FIG. 17 is a flow chart of an implementation of a process for performing a create zone request.

FIG. 17 is a flow chart of an example of a process 1700 for performing a create zone request. More particularly, process 1700 illustrates, in detail, the interaction between DNS GUI 1710 and DNS Web Service 1730 via DNS Web Service client API 1720. Generally, the operations of process 1700 may be used in conjunction with the systems and configurations described earlier in, for example, FIGS. 15-18. The particular components that perform the various operations of process 1700 are shown in FIG. 17 and are referenced as performing the operations. However, similar methodologies may be applied in other implementations where different components are used to define the structure of the system, or where the functionality is distributed differently among the components shown.

As described above, DNS GUI 1710 communicates with DNS Web Service 1730 via DNS Web Service client API 1720. As shown, DNS Web Service client API 1720 includes DNS Delegate 1721, LDMP XML Generator 1722, LDMP Data Access Object (DAO) 1723, and LDMP XML Parser 1724.

For programs that access the DNS Web Service client API 1720, such as, for example, DNS GUI 1710, DNS Delegate 1721 may be the point of contact. In other words, the component of the DNS Web Service client API 1720 that is being accessed when the DNS GUI 1710 contacts the DNS Web Service client APT 1720 is the DNS Delegate 1721. The DNS Delegate 1721 includes information for recognizing each type of request that it may receive from the DNS GUI 1710. As such, DNS GUI 1710 sends a request (e.g., a create (or reserve) zone request) (1760) to the DNS Web Service client API 1720 via the DNS Delegate 1721.

The DNS Delegate 1721 recognizes the request (e.g., a create zone request) as a particular request type and transmits the request type recognized (e.g., create zone request) to LDMP XML Generator 1722 (1761). The LDMP XML Generator 1722 translates the request into an LDMP message (e.g., an LDMP-compliant XML message) in a manner similar to translation of a request into IDP by the IDP XML Generator 822 of the DP client API 820 of FIG. 8. The LDMP XML Generator 1722 sends the LDMP message to the DNS Delegate 1721 (1762).

The DNS Delegate 1721 receives the LDMP message and sends it to the LDMP DAO 1723 (1763). The LDMP DAO 1723 handles interaction between the DNS Web Service client API 1720 and the DNS Web Service 1730. As such, the LDMP DAO 1723 sends the LDMP message to the DNS Web Service 1730 over HTTPS (e.g., an LDMP transport substrate) (1764).

The DNS Web Service 1730 receives the LDMP message, processes the LDMP message, as described in detail below, and sends a response, which is also an XML-compliant LDMP message, referred to as an LDMP response, back to the LDMP DAO 1723 (1765).

The LDMP DAO 1723 receives the LDMP response from the DNS Web Service 1730 and sends the LDMP response to the LDMP XML Parser 1724 for parsing (1766). The LDMP XML Parser 1724 determines if the LDMP response is a valid LDMP response, which may include checking the form (e.g., security) and content of the response. The LDMP XML Parser 1724 then forwards the validated LDMP response to the LDMP DAO 1723 (1767), which in turn sends the response to the DNS Delegate 1721 (1768). The DNS Delegate 1721 recognizes the response as being an XML-compliant LDMP response and sends the LDMP response back to the LDMP XML Parser 1724 for additional parsing (1769).

The LDMP XML Parser 1724 receives the LDMP response and checks the LDMP response for errors. Errors may occur during any of the operations of process 1700.

TABLE 2

| Error Type | Error Example |
|---|---|
| Communication Error | Trouble connecting to the DNS Web Service |
| Configuration Error | Non-readable DNS Web Service URL (from the configuration file) |
| Validation Error | LDMP response is not valid XML; LDMP response is not appropriate for the request |
| Programming Error | Internal state is inconsistent with the expected state |

If no errors are found, the LDMP XML Parser 1724 converts the LDMP response into one or more objects (e.g., Java objects). For the create zone request of the present example, the objects generated by the LDMP XML Parser 1724 may be new zone objects. In this way, the LDMP XML Parser 1724 performs the opposite function of the LDMP XML Generator 1722. In some implementations, the LDMP XML Parser 1724 may parse and convert the LDMP response during a single operation.

The LDMP XML Parser 1724 sands the newly generated objects (e.g., new zone objects) back to the DNS Delegate 1721 (1770). The DNS Delegate 1721 provides the converted response (e.g., the new zone objects), which includes the results of the create new zone request (e.g., information about the new zone), to the DNS GUI 1710 for display to the user (1771).

A create zone request LDMP message, as described above with respect to FIG. 17, is just one type of LDMP message that may be generated by the DNS Web Service client API 1720. Other LDMP messages may be generated to perform the following requests: (i) update a zone, (ii) delete a zone, (iii) lookup a zone, (iv) search zones, (v) export one or more zones, (vi) reconciliation of zone data, (vii) add (or reserve) a host, (viii) remove (or unreserve) a host, and (viv) lookup a host. Requests other than the create zone request illustrated in process 1700 may be processed in a manner similar to that shown in, and described with respect to FIG. 17.

All LDMP messages may include a user ID attribute that helps identify a human actor on whose behalf the LDMP client is invoking the request. In addition, all LDMP messages may include a "push now" attribute that indicates whether updated configurations associated with the request embodied by the LDMP message may be pushed to the DNS servers without delay rather than waiting for the DNS servers to load (or the DBDNS to push) the updated configurations at the next update interval.

Similarly, LDMP responses may be generated in response to each of the LDMP requests noted above. All LDMP responses may include a result element that details the result of processing a corresponding request (based on the original LDMP message) on the DNS server side. The result element may include a code attribute, a message element, and zero or more error value elements. An error value element may identify an invalid data value and provide a reason (e.g., a code) for that error. The error value information may help pinpoint errors in, for example, data provided by the user on the DNS GUI side.

Figure 18:
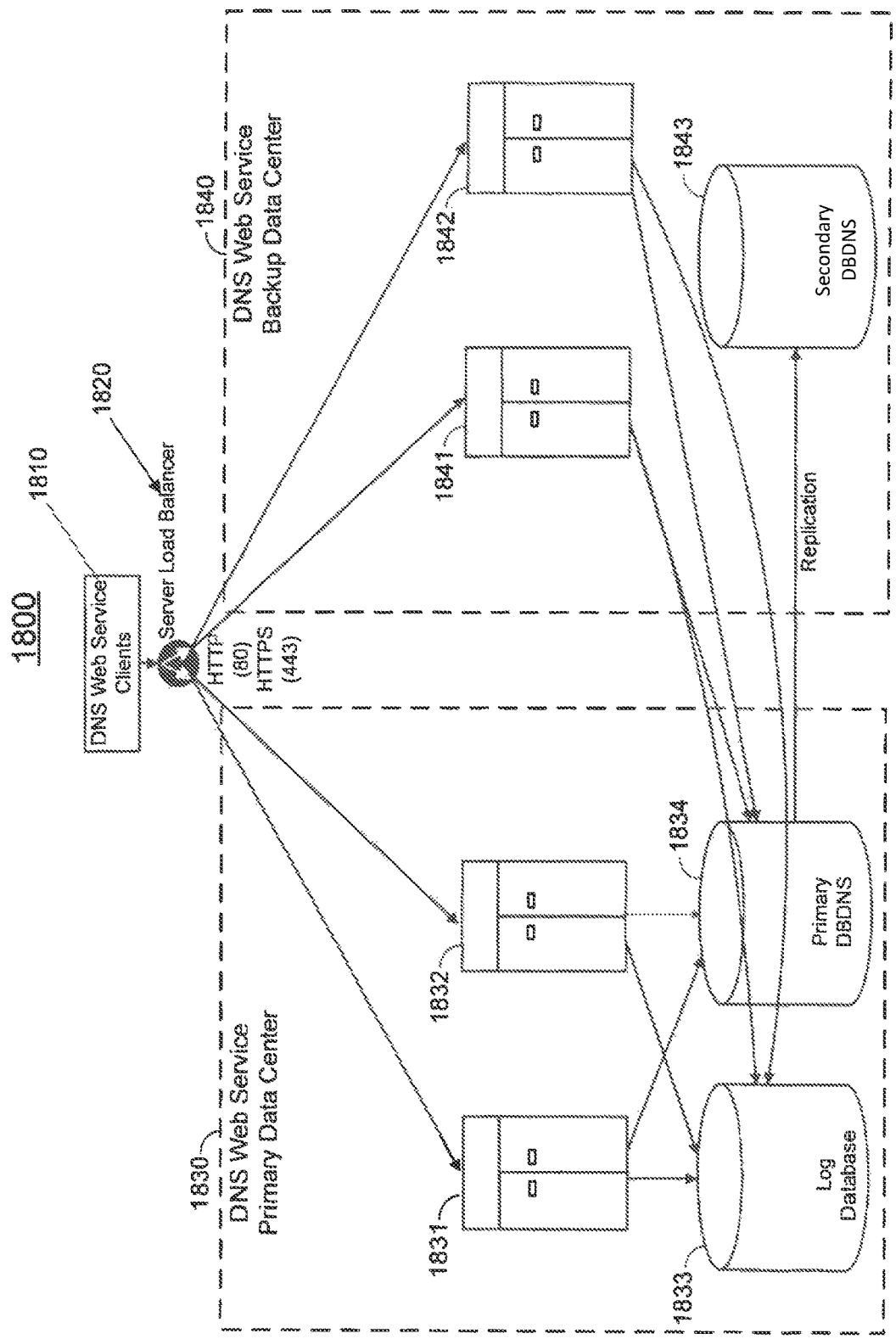
FIG. 18 is a block diagram that represents an example of a physical architecture of the DNS system.

FIG. 18 is a block diagram 1800 that represents an example of a physical architecture of the DNS 1520. As shown, block diagram 1800 includes DNS Web Service clients 1810, as described above, a server load balancer 1820 and both a Primary DNS Web Service Data Center 1830 and a Backup DNS Web Service Data Center 1840. The DNS Web Service clients 1810 may contact load balancer 1820 and be routed to one of the four application servers included within Primary Data Center 1830 and Backup Data Center 1840.

The Primary Data Center 1830 and the Backup Data Center 1840 may operate in a failover configuration, such that if the Primary Data Center 1830 fails due to, for example, a power outage or network access problem, the Backup Data Center 1840 takes over the DNS Web Service responsibilities and load. After a failover occurs, and upon successful rebooting, the Primary Data Center 1830 then may provide backup to the Backup Data Center 1840, which is now carrying the entire load for the DNS Web Service. In some implementations, the Primary Data Center 1830 and the Backup Data Center 1840 may be located in distinct geographic locations to provide further security.

Within each of the Primary Data Center 1830 and Backup Data Center 1840, two application servers 1831, 1832, 1841, and 1842, respectively, nm the DNS Web Service. For additional security, the application servers within each Data Center may be identical to one another and also are operated in a failover configuration, such that if, for example, within the Primary Data Center 1830, application server 1831 fails, application server 1832 takes over responsibility for, and load of, running the DNS Web Service. More particularly, and in one example, application server 1831 may be the primary application server for Primary Data Center 1830, with application server 1832 acting as a backup of application server 1831. Application server 1841 of Backup Data Center 1840 may be the primary backup application server, with application server 1842 providing a backup for application server 1842 (e.g., the secondary backup to the primary backup).

Each of the application servers 1831, 1832, 1841, and 1842 has access to Log Database 1833 and Primary DBDNS 1834. Log Database 1833 may store log information related to, for example, failure events. Primary DBDNS 1834, as described above, may store, and act as a staging area for, DNS server configuration information. Primary DBDNS 1834 may replicate its information in Secondary DBDNS 1843, which may server as a backup database for DNS server configuration information. If Primary DBDNS 1834 fails, Secondary DBDNS 1843 may take over the load and become the primary DNS database. If this occurs, the configurations of the application servers 1831, 1832, 1841, and 1842 may be updated to provide direct access to the Secondary DBDNS 1843, rather than Primary DBDNS 1834.

Figure 19:
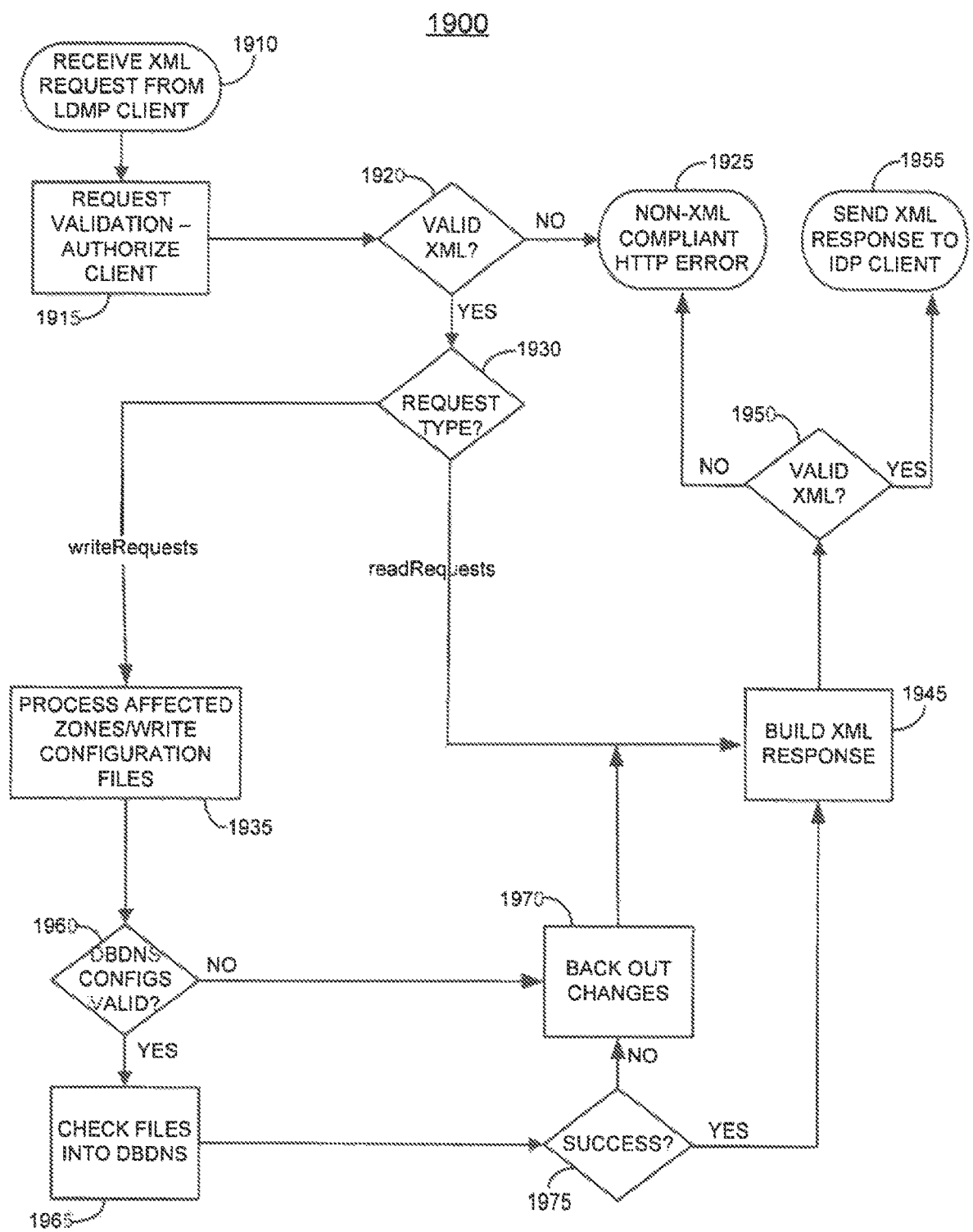
FIG. 19 is a flow chart of an example of a process for handling LDMP requests.

FIG. 19 is a flow chart of an example of a process 1900 for handling LDMP requests. Generally, the operations of process 1900 may be used in conjunction with the systems and configurations described earlier in, for example, FIGS. 15-18. Mom particularly, process 1900 provides an illustration of the processing that is performed by an DNS Web Service, when handling an LDMP request, and the DNS Web Service will be referenced as performing the operations of process 1900. However, similar methodologies may be applied in other implementations where different components are used to define the structure of the system, or where the functionality is distributed differently among the components shown.

As described above, the DNS Web Service is responsible for receiving updates to DNS server configurations from PAM and persisting the configurations (at least temporarily) in the DBDNS. In some implementations, a server running the DNS Web Service, such as, for example, any one of application servers 1831, 1832, 1841, and 1842 of FIG. 18, may be implemented in, for example, Perl. The DNS Web Service may interact with the DNS GUI as described above.

The DNS Web Service receives an XML-compliant LDMP request from an LDMP client (1910). The LDMP client may be, for example, the DNS Web Service client API. For example, the DNS Web Service receives a create zone request from the DNS GUI via the DNS Web Service client API.

The DNS Web Service requests XML validation and verifies the authorization of the LDMP client from which the LDMP request was received (1915). In one implementation, the DNS Web Service may verify a Pretty Good Privacy (PGP) signature of the request to verify the authorization of the DNS Web Service client API and determine its privileges (e.g., read-only or read and write) with respect to the DNS configurations controlled by the DNS Web Service. In another implementation, the DNS Web Service may use SSL certificates to verify authority. The certificate authority and the certificate serial number used to establish the HTTPS connection may be verified and used to establish access privileges. Regardless of the type of security attached to the LDMP request, and in one implementation, the DNS Web Service may validate the request using the Xerces Perl XML parser (se, e.g., http://xml.apache.org/xerces).

The DNS Web Service determines whether the request is valid (1920). If the request is invalid, the DNS Web Service returns an HTTP error (e.g., "Non-XML Compliant") to the DNS GUI via the DNS Web Service client API (1925).

If the request is valid, the DNS Web Service determines the request type (1930). Request types may include any of the LDMP message types described above, such as, for example, requests related to creating, deleting, or editing zones, reserving, unreserving, or editing hosts, and lookup or export of zone or host information. The request types may be placed into two categories: (1) write requests (e.g., create a zone and reserve a new host) and (2) read requests (e.g., lookup a zone).

The DNS Web Service may determine that a particular LDMP request is a read request (1930). If so, the DNS Web Service builds an XML (e.g., LDMP) response to the read request that may provide the information requested (1945). To build the response, the DNS Web Service may access relevant DNS server configurations (e.g., via the DBDNS) to identify the information requested (e.g., lookup a zone).

Alternatively, the DNS Web Service may determine that a particular LDMP request is a write request (1930). If so, the DNS Web Service may process the changes to the particular zone or host affected by the write request and generate updated configurations for the enterprise's DNS servers (1935).

The DNS Web Service checks the newly updated configurations to determine if they are valid (1960). If the configurations are not valid, the DNS Web Service backs out of the changes (1970). If the configurations are valid, the DNS Web Service checks the files into (e.g., stores the files in) DBDNS (1965).

If the updated configurations are not successfully stored in the DBDNS (1975), the DNS Web Service backs out of the changes (1970). If the store operation is successful (1975), the DNS Web Service builds an XML (e.g., LDMP) response indicating that the DNS server configurations have been updated based on the read request and the updated configurations were successfully stored in DBDNS (1945).

Upon checking the new DNS server configurations into DBDNS, a unique request identification number may be logged with the change. The unique request identification number may help correlate each request to a specific version of the DNS configuration files in the DBDNS. Thus, if an error is encountered during any stage of processing or otherwise, the DNS servers may simply roll back to the previous valid set of configuration files, thereby enabling the DNS serves to continue running while an administrator investigates the problem.

Once the DNS Web Service has built an LDMP response (for any of the scenarios described above), the DNS Web Service determines if the LDMP response is a valid XML message (1950). If the LDMP response is not a valid XML message, the DNS Web Service sends an HTTP error (e.g., "Non-Compliant XML") back to the DNS GUI via the DNS Web Service client API (1925). If the LDMP response is a valid XML message, the message is sent to the DNS GUI via the DNS Web Service client API (1955). In some implementations, prior to sending an LDMP response to the DNS GUI, the LDMP response may be authenticated by, for example, PGP-signing the response.

The LDMP protocol may enable communication between an enterprise's IPAM system and DNS system. Therefore, the entire DNS system can be managed trough a DNS interface (e.g., DNS GUI) leading to a more holistic approach to the management of the enterprise's IP address space. As described above, the IDP protocol may enable communication between an enterprise's IPAM system and DHCP system. Therefore, the entire DHCP system can be managed through an IPAM interface (e.g., IPAM GUI) also leading to a more holistic approach to the management of the enterprise's IP address space. By combining the IDP and LDMP systems (e.g., protocols), an enterprise's entire namespace, including IPAM, DHCP, and DNS may be managed using an integrated system via a single DNS-IPAM GUI (or two closely related GUIs). Such a combination enables administrators to fully appreciate the holistic nature of the enterprise's IP address space and ensure security across all aspects of that namespace.

Figure 20A:
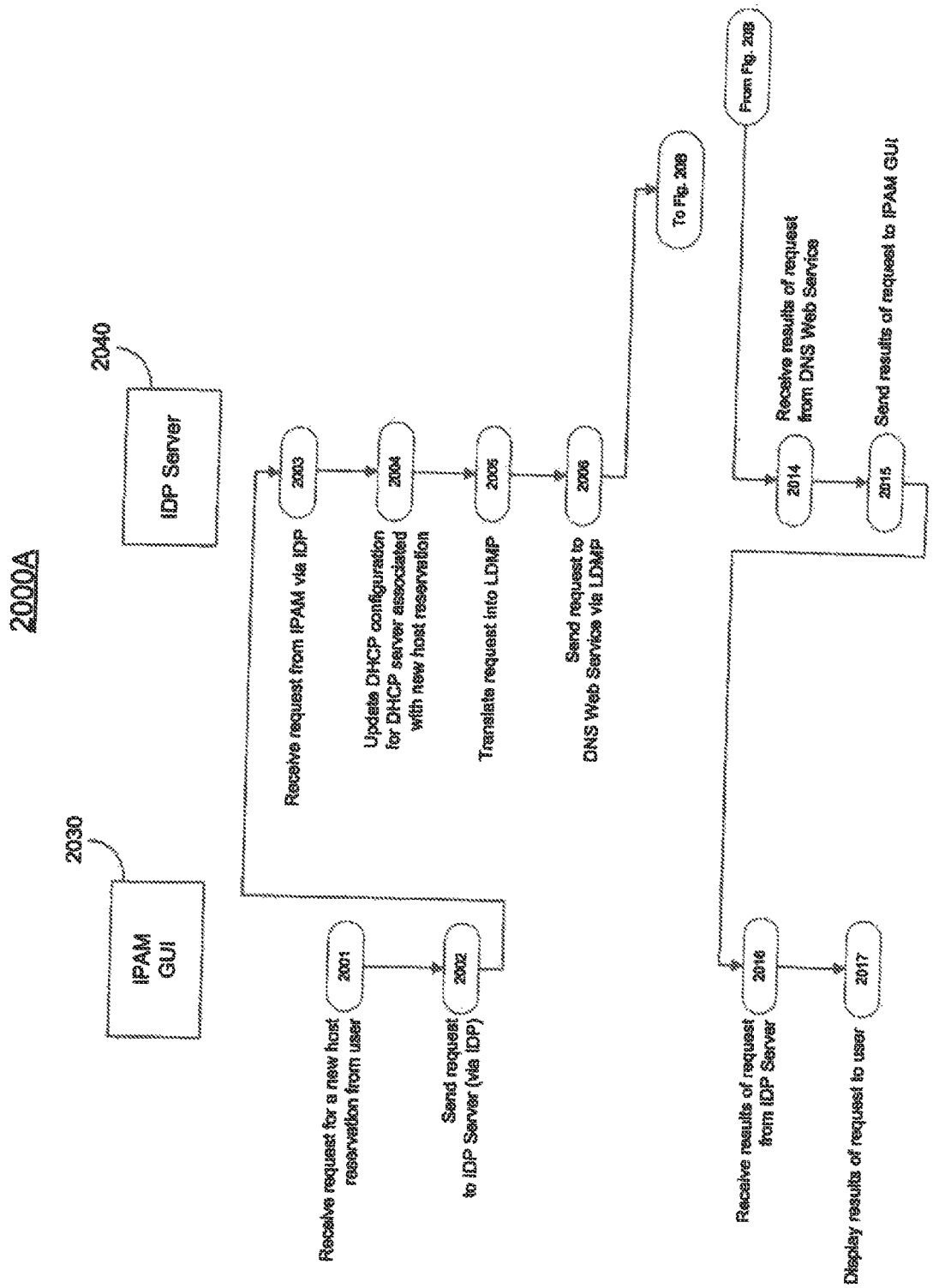
FIGS. 20A and 20B are flow charts of a process for creating a new host reservation.
Figure 20B:
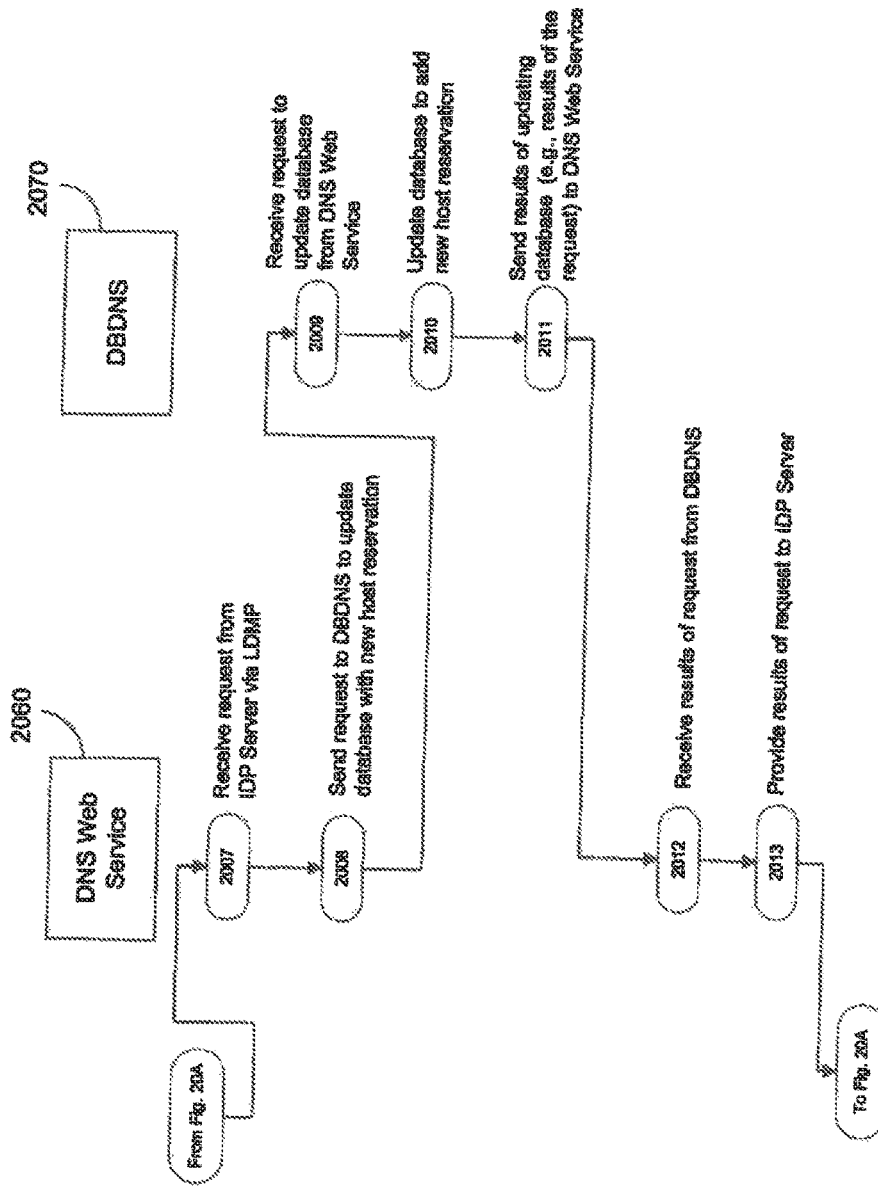

FIGS. 20A and 20B are flow charts of examples of processes 2000A and 2000B for creating a new host reservation. Generally, the operations of processes 2000A and 2000B may be used in conjunction with the systems and configurations described earlier in, for example, FIGS. 1-5 and 15-18. More particularly, the particular components that perform the various operations of processes 2000A and 2000B are shown in FIGS. 20A and 20B and are referenced as performing the operations. However, similar methodologies may be applied in other implementations where different components are used to define the structure of the system, or where the functionality is distributed differently among the components shown.

Referring first to FIG. 20A and process 2000A, IPAM GUI 2030 receives a request from a user (e.g., an administrator) for a new host reservation (2001). In some implementations, the user may provide the request to reserve a new host via the DNS GUI or a subportion of the IPAM GUI that is associated with DNS configurations. IPAM GUI 2030 sends the new host reservation request to the IDP server 2040 using IDP (2002). Prior to transmitting the request to the IDP server 2040, the request is translated into an IDP XML-compliant protocol as described above.

IDP server 2040 receives the IDP request for the new host reservation from IPAM GUI 2030 (2003). The new host reservation request may include various information related to the creation of the new host such as, for example, a relevant DHCP scope and IP address(es). IDP server 2040 updates the DHCP configuration (by persisting the updated DHCP configuration in CVS) for the DHCP server that is associated with the new host request (2004).

IDP server 2040 translates the new host reservation request into LDMP (2005). The translation of the request into LDMP may be performed by IDP server 2040 in a manner similar to that described with respect to FIG. 17. IDP server 2040 sends the LDMP-compliant request to the DNS Web Service 2060 using LDMP (2006).

Now referring to FIG. 20B and process 2000B, DNS Web Service 2060 receives the new host reservation request from IDP server 2040 using LDMP (2007). As described above, DNS Web Service 2060 receives requests via a DNS Web Service client APL The DNS Web Service 2060 sends a request to update the database to DBDNS (2008). The update request may include information that enables the DBDNS to update a configuration associated with one or more DNS servers that are affected by the new host reservation.

DBDNS 2070 receives the update request from DNS Web Service 2070 (2009). DBDNS 2070 updates the database to include the new host reservation (2010) and sends the results of the database update back to DNS Web Service 2060 (2011). At the next update interval when the DNS servers contact DBDNS 2070 to retrieve their updated configurations, the new host reservation may be included. If the new host reservation request included a "push now" indication, the update database request sent from DNS Web Service 2060 to DBDNS 2070 may include instructions for the DBDNS 2070 to contact the DNS severs and request that they pick up their updated configurations without delay (e.g., immediately) and before the next update interval. As described above, the DNS Web Service 2060 and DBDNS 2070 may communicate with one another via a DBDNS client API and, in some implementations, may do so using a protocol other than LDMP.

DNS Web Service 2060 receives the results of updating the database within DBDNS 2070 (2012). For example, the results may indicate if DBDNS 2070 was successfully updated or if there was an error. DNS Web Service 2060 sends the results of the update operation to IDP server 2040.

Referring again to FIG. 20A and process 2000A, IDP server 2040 receives the results of updating the database from DNS Web Service 2060 (2014) and sends the results of the request to IPAM GUI 2030 (2015). IPAM GUI 2030 receives the results from IDP server 2040 (2016) and displays the results of the user's request for a new host reservation to the user (2017).

Figure 21:
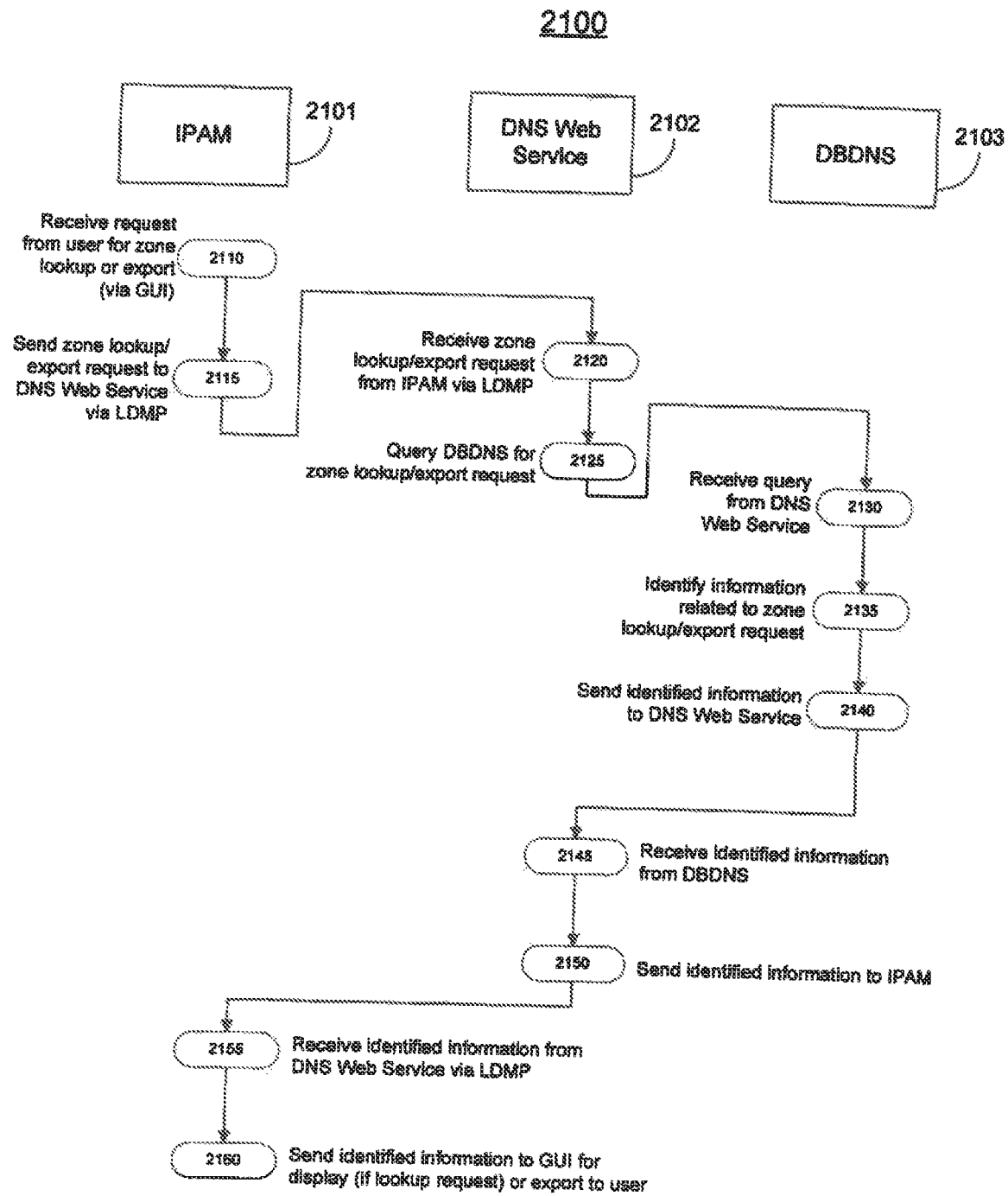
FIG. 21 is a flow chart of an example of a process for a zone lookup and export.

FIG. 21 is a flow chart of an example of a process 2100 for azone lookup and export. Generally, the operations of process 2100 may be used in conjunction with the systems and configurations described earlier in, for example, FIGS. 1-5 and 15-18. More particularly, the particular components that perform the various operations of process 2100 are shown in FIG. 21 and are referenced as performing the operations. However, similar methodologies may be applied in other implementation where different components are used to define the structure of the system, or where the functionality is distributed differently among the components shown.

IPAM 2101 receives a request from a user for a zone lookup or zone export via the IPAM GUI (2110). IPAM 2101 sends the zone lookup/export request to DNS Web Service 2100 via LDMP (2115). As described above, a request may be translated into LDMP by the IDP server or the DNS Web Service client APL DNS Web Service 2102 receives the zone lookup/export request from IPAM 2101 via LDMP (2120). More particularly, DNS Web Service 2102 receives the request from IPAM 2101 via the DNS Web Service client APL DNS Web Service 2102 queries DBDNS 2103 for information associated with the zone lookup/export request (2125). For example, if the request seeks to identify information associated with a particular zone, DNS Web Service 2102 queries DBDNS 2103 for DNS server configurations that include information related to the particular zone.

DBDNS 2103 receives the query from DNS Web Service 2102 (2130). The query may include relevant information about the zone that is to be looked-up or exported. DBDNS 2103 identifies information within one or more DNS server configurations that is related to the zone lookup/export request (2135). DBDNS 2103 sands the identified information to DNS Web Service 2102 (2140). As described above, DNS Web Service 2102 and DBDNS 2103 may communicate with one another via a DBDNS client APL DNS Web Service 2102 receives the identified information from DBDNS 2103 (2145) and sends the identified information to IPAM 2101 (2150). IPAM 2101 receives the identified information from DNS Web Service 2101 via LDMP (2155). Because, in some implementations, DBDNS 2103 and DNS Web Service 2102 may not communicate via LDMP, any message received by DNS Web Service 2102 from IPAM 2101 via LDMP (e.g., a zone lookup/export request) may be translated from LDMP to another protocol before being sent on to DBDNS 2103. Similarly, any message received by DNS Web Service 2102 from DBDNS 2103 (e.g., a message that includes the identified information in response to the request) may be translated into an LDMP XML-compliant message prior to being transmitted from DNS Web Service 2102 to IPAM 2101. As described above, such translation may be performed by the IDP server or DNS Web Service client API.

IPAM 2101 receives the identified information from DNS Web Service 2102 via LDMP (2155) and provides the identified information to the IPAM GUI for display to the user, if the request was for a zone lookup, or export to the user if the request was for a zone export. Information that is exported may be provided to the user outside of the IPAM GUI application such as, for example, as a spreadsheet or text document.

In some implementations, and as described above, LDMP may include a "push now" feature that is configured to advise the DBDNS that a change (initiated, for example, by a user via the DNS GUI) may be provided (or pushed) to an enterprise's DNS servers without delay (e.g., immediately) rather than waiting for the DNS servers to load their updated configurations at the next, regularly-scheduled update interval. Most, if not all, LDMP requests may include a "push now" indicator or flag, which may be set if a user has indicated that the request is to be "pushed now".

Figure 22:
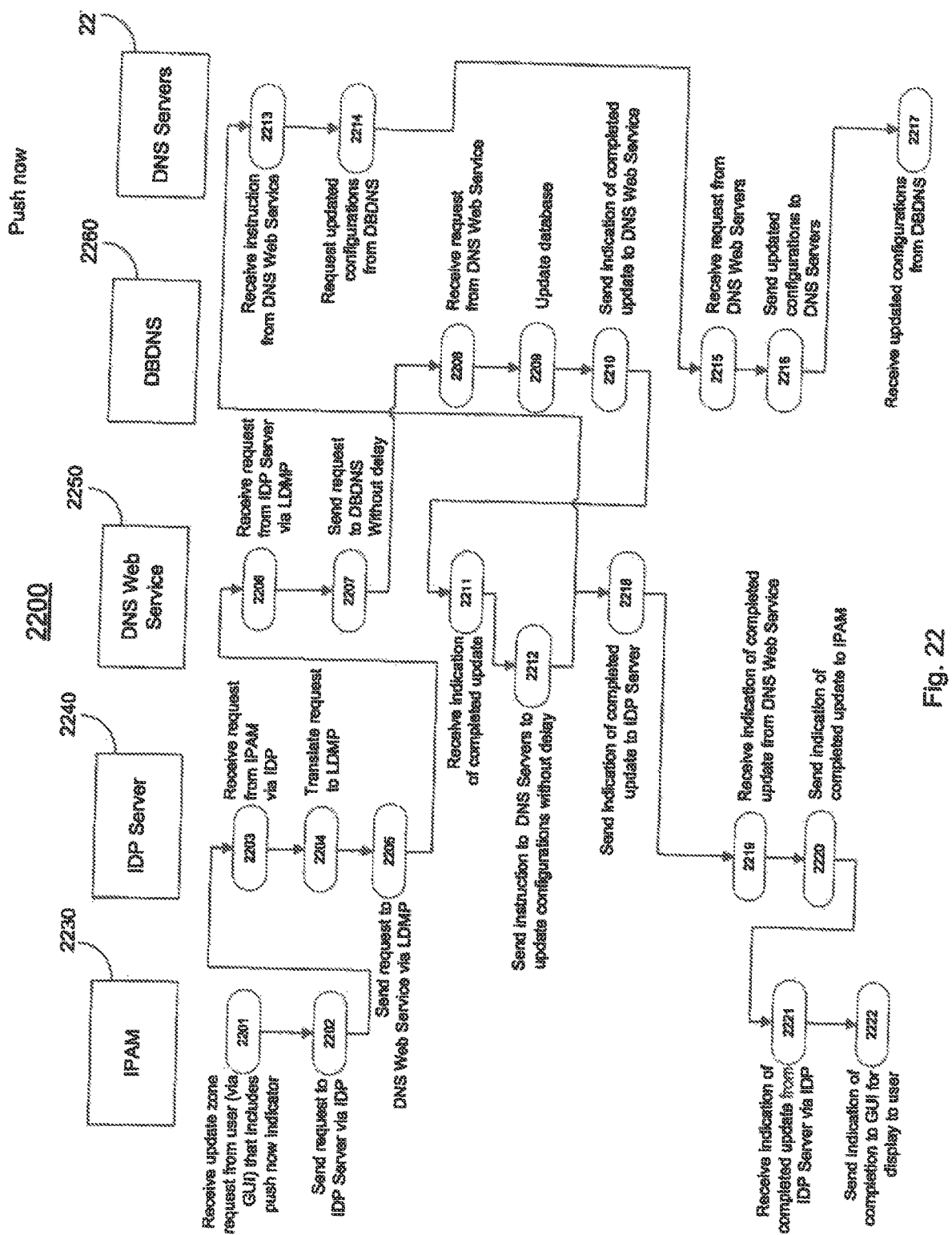
FIG. 22 is a flow chart of an example of a process for associating an updated DNS server configuration, in response to a particular LDMP request, with a "push now" indication.

FIG. 22 is a flow chart of an example of a process 2200 for associating an updated DNS server configuration, in response to a particular LDMP request, with a "push now" indication. Generally, the operations of process 2200 may be used in conjunction with the systems and configurations described earlier in, for example, FIGS. 1-5 and 15-18. More particularly, the particular components that perform the various operations of process 2200 are shown in FIG. 22 and are referenced as performing the operations. However, similar methodologies may be applied in other implementations where different components are used to define the structure of the system, or where the functionality is distributed differently among the components shown.

IPAM 2230 receives an update zone request from a user (via the IPAM GUI) with an indication that the results of the request should be "pushed now" to the relevant DNS servers (2201). The user may indicate that the request is subject to a "push now" command by selecting an appropriate user interface element (e.g., a button, checkbox, or hyperlink) when generating the request. IPAM 2230 mends the request to IDP server 2240 via IDP (2202).

IDP server 2240 receives the request form IPAM 2230 via IDP (2203) and translates the request to an LDMP XML-compliant message (2204). IDP server 2240 sends the translated request to DNS Web Service 2250 via LDMP (2205). DNS Web Service 2250 receives the request from IDP server 2240 via LDMP (2206) and sends the request to DBDNS 2260 without delay (2207).

DBDNS 2260 receives the request from DNS Web Service 2250 (2208) and updates the database according to the zone information associated with the request (2209). DBDNS 2260 sends an indication that the update has been successfully completed (or, alternatively, may send an error message if the update was not successful) to DNS Web Service 2250 (2210).

DNS Web Service 2250 receives the indication of completion of the update to the DBDNS 2260 (2211). In response to receipt of the indication from the DBDNS 2260, DNS Web Service 2250 sends an instruction to the DNS servers 2270 requesting tat they load their updated configurations from DBDNS 2270 without delay (2212). The instruction sent to the DNS servers 2270 may require the DNS servers 2270 to load the updated configuration files, for example, immediately, within the next hour or day, or at any time before the next, regularly-scheduled update interval.

DNS servers 2270 receive the instruction from the DNS Web Service 2250 (2213) and request their updated configurations from DBDNS 2260 (2214). DBDNS 2260 receives the request for updated configurations from DNS servers 2270 (2215), and mends the updated configurations to the DNS servers 2270 (2216), which receives them in response (2217). In some implementations, upon receipt of the request for the updated configurations, DBDNS 2260 may enable the DNS servers 2270 to access the updated configurations rather than actively sending the updated configurations to the DNS servers 2270.

Also in response to receipt of the indication from the DBDNS 2260, DNS Web Service 2250 sends an indication of the completion of the DBDNS 2260 update (as wall as, optionally, the DNS servers' receipt of their updated configurations) to IDP server 2240 (2218). IDP server 2240 receives the indication that the DBDNS 2260 update was completed from DNS Web Service 2250 (2219) and sands the indication of completion to IPAM 2230 (2220).

IPAM 2230 receives the indication of completion from IDP server 2240 via DP (2221). IPAM 2230 sends the indication that DBDNS 2260 was successfully updated with the new zone information (and, optionally, that the DNS servers 2270 picked up their updated configurations from DBDNS 2260 in response thereto) to the IPAM GUI for display to the user (2222).

In some implementations, the "push now" command may refer to when and how quickly an update is sent to DBDNS 2260 via DNS Web Service 2250. Additionally or alternatively, the "push now" command may refer to when and how quickly an updated configuration is loaded into a DNS server to which the updated configuration applies. Furthermore, the push from DNS Web Service 2250 to DBDNS 2260, as well as the push from DBDNS 2260 to DNS servers 2270 may be initiated by either DNS Web Service 2250, DBDNS 2260, or some combination of action by the two components.

As described above, combining the functionality provided by IDP and LDMP enables management of IPAM, DHCP, and DNS using a single integrated system. As such, information and settings stored by, and within, the various components may easily be reconciled.

Figure 23:
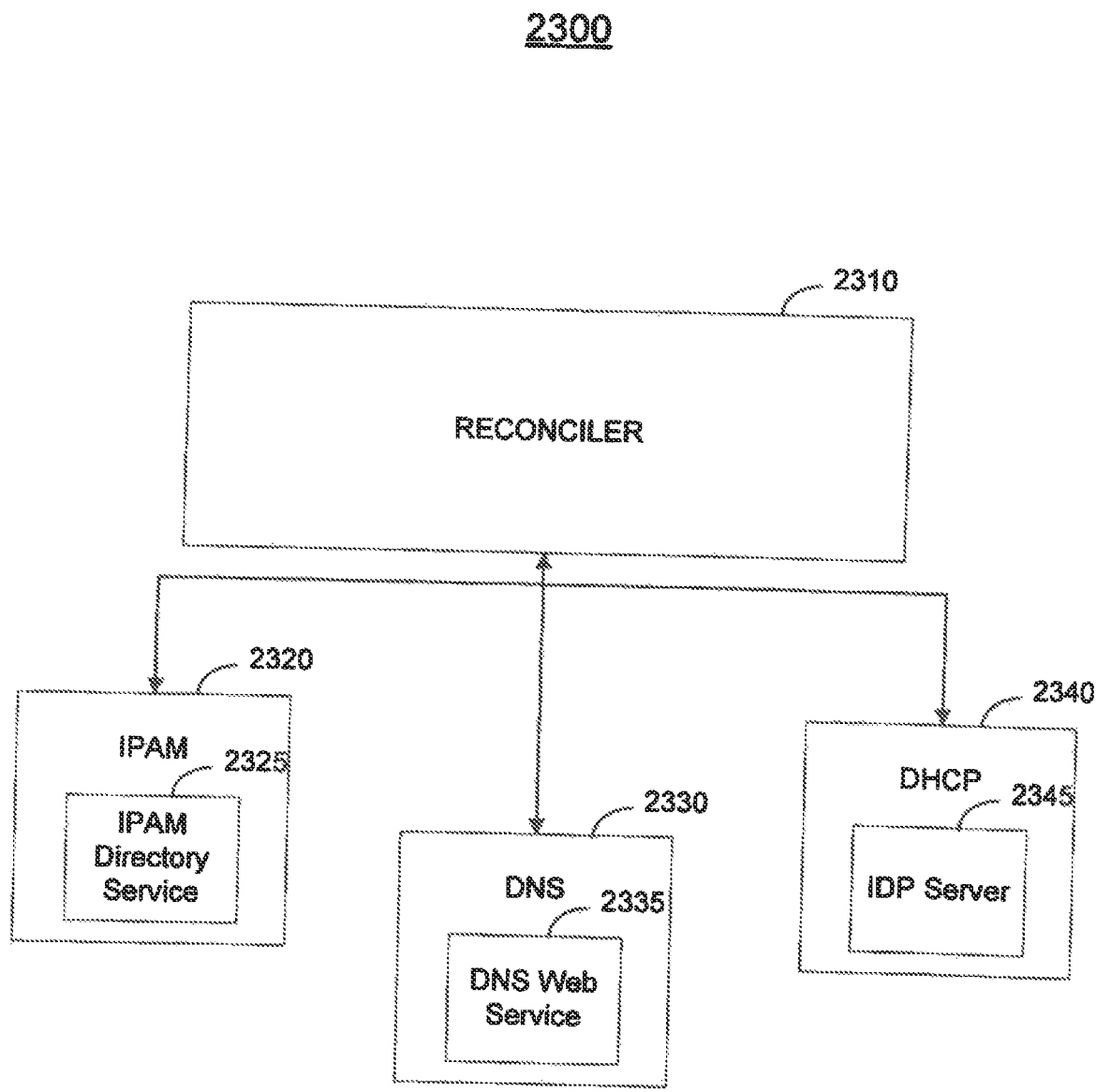
FIG. 23 is a block diagram that represents an example of a logical view of the components required for reconciliation of data among and between IPAM, DHCP, and DNS services.

FIG. 23 is a block diagram 2300 that represents an example of a logical view of the components required for reconciliation of data among and between IPAM, DHCP, and DNS. Block diagram 2300 includes a reconciler 2310, IPAM 2320, DNS 2330, and DHCP 2340.

Reconciler 2310 may be an application or server that is configured to communicate with IPAM 2320, DNS 2330, and DHCP 2340 to retrieve information related to an enterprise's IP address namespace that is stored within, or accessible by, those components. Reconciler 2310 may communicate with IPAM via a direct database connection or a web service, such as, for example, IPAM Directory Service 2325. Reconciler 2310 may communicate with DNS via a direct database connection or an LDMP web service, such as, for example, the DNS Web Service 2335. Reconciler 2310 may communicate with DHCP 2340 via IDP server 2345. Reconciler 2310 may be configured to reconcile the information stored within IPAM, DHCP, and DNS by performing process 2400 of FIG. 24, as described below.

Figure 24:
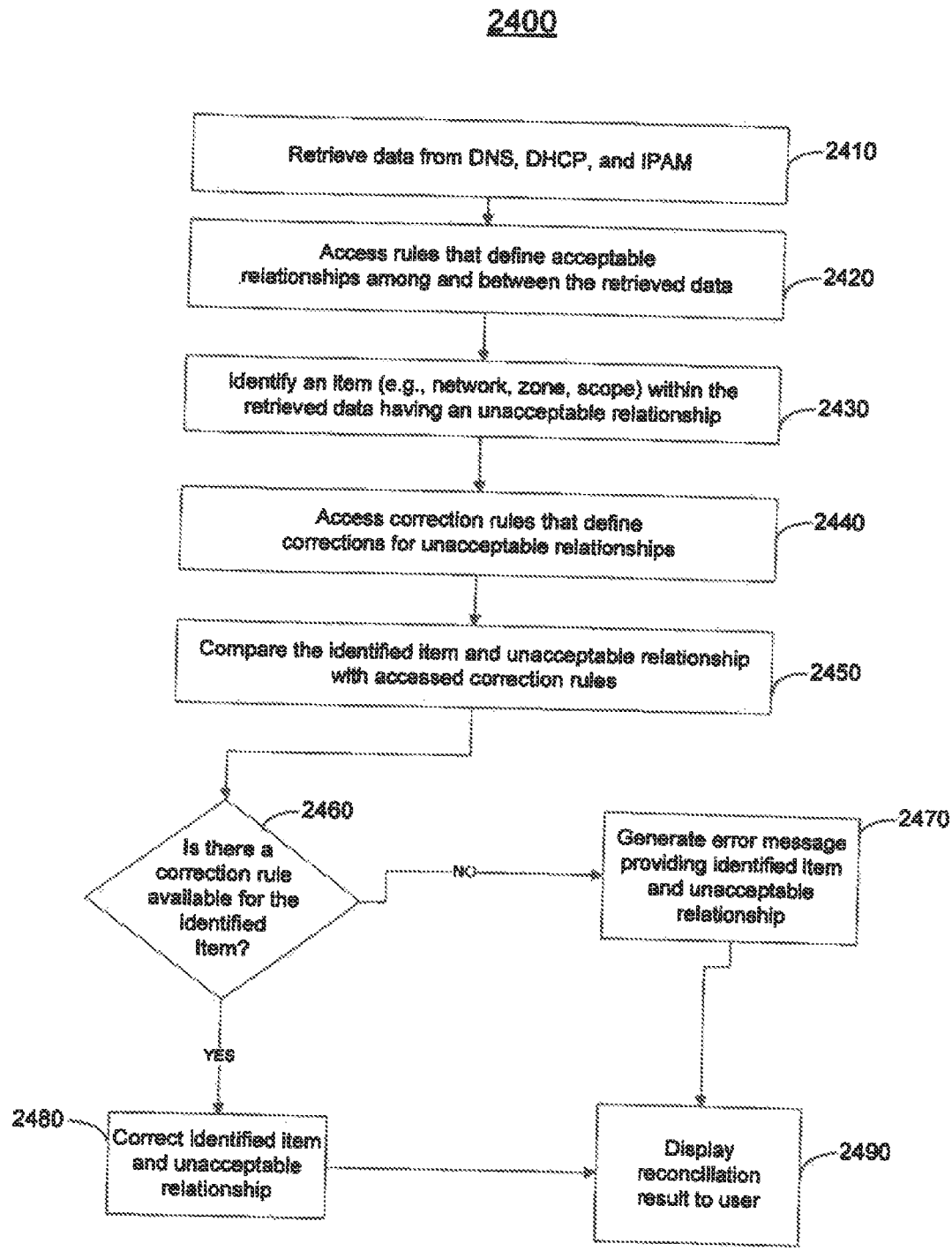
FIG. 24 is a flow chart of an example of a process for reconciling data stored within PAM, DHCP, and DNS services.

FIG. 24 is a flow chart of an example of a process 2400 for reconciling data stored within IPAM, DHCP, and DNS. Generally, the operations of process 2400 may be used in conjunction with the systems and configurations described earlier in, for example, FIGS. 1-5 and 15-18. More particularly, reconciler 2310 of FIG. 23 may be configured to perform the various operations of process 2400 and is referenced as performing the operations. However, similar methodologies may be applied in other implementations where different components are used to define the structure of the system, or where the functionality is distributed differently among the components shown.

Reconciler 2310 retrieves data from DNS, DHCP, and IPAM (2410). As described above with respect to FIG. 23, and for example, reconciler 2310 communicates with DNS via a DNS Web Service, with IPAM via an IPAM Directory Service, and with DHCP via an IDP server. For example, reconciler 2310 retrieves host and zone data from DNS, scope data from DHCP, and IP address data from IPAM.

Reconciler 2310 accesses rules that define acceptable relationships among and between the retrieved data (2420). The rules may be stored, for example, at a database within the enterprise's IP address space anywhere that is accessible to reconciler 2310. The access rules may exist to identify inconsistencies in the data for a single IP address space. For example, the rules may define a relationship between data in DNS and IPAM, such that, for example, a reverse zone in DNS may have a corresponding network in IPAM. If a particular item of data (e.g., a particular reverse zone in DNS) does not meet the defined relationship, an unacceptable relationship may be identified. Rules may exist to identify other unacceptable relationships, such as, for example, (1) a network in IPAM that does not have a corresponding reverse zone in DNS, (2) a scope in DHCP that does not have a corresponding reverse zone in DNS, and (3) a DHCP host reservation with a conflicting DNS record.

Reconciler 2310 identifies an item within the retrieved data having an unacceptable relationship (2430). The item identified may be a particular network, zone, or scope. As in the example above, reconciler 2310 may identify a particular reverse zone in DNS without a corresponding network in IPAM; that is, an item (e.g., a reverse zone) in DNS that has an unacceptable relationship with IPAM.

Reconciler 2310 accesses correction rules that define corrections for unacceptable relationships (2440). The correction rules, for example, may indicate how to transform an unacceptable relationship into an acceptable relationship. In the present example of the particular reverse zone in DNS without a corresponding network in IPAM, the reconciler 2310 may access a rule for (1) identifying a network to correspond with the particular reverse zone in DNS and (2) generating an association between the particular reverse zone and the newly identified network in IPAM.

Reconciler 2310 compares the identified item with the accessed correction rules (2450) and determines if a correction rule is available for the identified item (2460). In the present example, reconciler 2310 may compare the unacceptable relationship of a particular reverse zone in DNS not having a corresponding network in IPAM with the corresponding item (e.g., zone) to the accessed correction rules.

If a comparison between the accessed correction rules and the unacceptable relationship identified in operation 2430 indicates that a particular correction rule exists for the identified unacceptable relationship, reconciler 2310 corrects the identified item and unacceptable relationship (2480). In the present example, if a correction rule exists to correct the situation where a particular reverse zone in DNS does not have a corresponding network in IPAM, reconciler 2310 may correct the unacceptable relationship based on the accessed correction rule.

If a comparison between the accessed correction rules and the unacceptable relationship identified in operation 2430 indicates that a particular correction rule does not exist for the identified unacceptable relationship, reconciler 2310 generates an error message that provides the identified item and unacceptable relationship to a user (2470). In the present example, if a correction rule does not exist to correct the situation where a particular reverse zone in DNS does not have a corresponding network in IPAM, reconciler 2310 may generate an error message that includes information related to the identified item and unacceptable information.

In either cue, the reconciler 2310 provides the result of the reconciliation to a GUI (e.g., DNS GUI or IPAM GUI, depending, in some cases, on how the user entered the reconciliation process) for display to the user (2490). If the unacceptable relationship identified in operation 2430 was successfully corrected, the GUI displays a access message to the user. If the unacceptable relationship was not corrected or was not able to be corrected (e.g., a correction rule did not exist for the unacceptable relationship), the GUI displays the error message to the user. Based on the error message, the user may correct the unacceptable relationship manually by, for example, adding a network in IPAM that corresponds to the reverse zone in DNS.

In some implementations, if no unacceptable relationships are identified by reconciler 2310, a message indicating that DNS, DHCP, and IPAM are reconcilable may be displayed to the user via a GUI in operation 2490.

Figure 25:
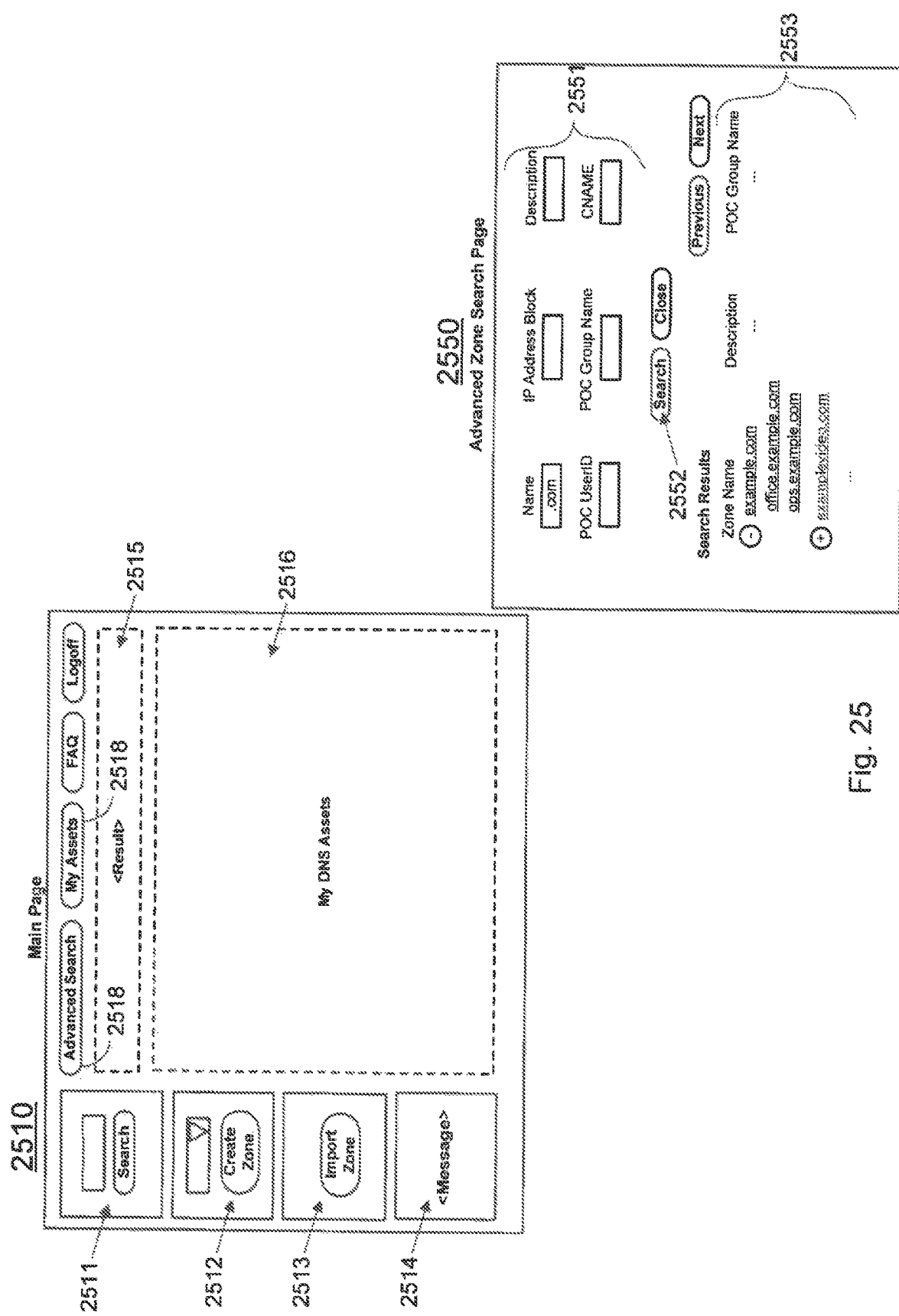
FIGS. 25 and 26 are illustrations of GUIs that may be presented to a user as part of the DNS GUI.

FIG. 25 is an illustration of a main page 2510 and an advanced zone search page 2550 of a DNS GUI. The main page 2510 of the DNS GUI includes various graphical interface elements (e.g., buttons, display section or input field) for managing DNS assets (e.g., zones). Main page 2510 includes element 2511 that enables a user to search for a particular DNS asset, element 2512 that enables a user to create a new zone, and element 2513 that enables a user to import a zone. Messages related to a user's DNS assets may be displayed in display element 2514.

The results of selecting one of elements 2511, 2512, or 2513 may be displayed in results section 2515. Similarly, all DNS assets associated with a particular user may be displayed in My DNS Assets display section 2516, which may be turned on or off by selecting element 2517.

A user may select the Advanced Search element 2518 to perform an advanced search for a zone. Selecting element 2518 causes advanced zone search page 2550, or a similar page, to be displayed. Advanced zone search page 2550 includes various fields 2551 that may be filled out to search for a particular zone. The fields include Name, IP Address Block, Description, Point of Contact (POC) User ID, POC Group Name, and CNAME. Advanced zone search page 2550 also includes results 2553 for a search initiated by filling out fields 2551 and selecting search element 2552. Each of results 2553 includes a zone name, description, and POC Group Name. For example, results 2553 include a zone named example.com, which also may encompass office.example.com and ops.example.com.

Figure 26:
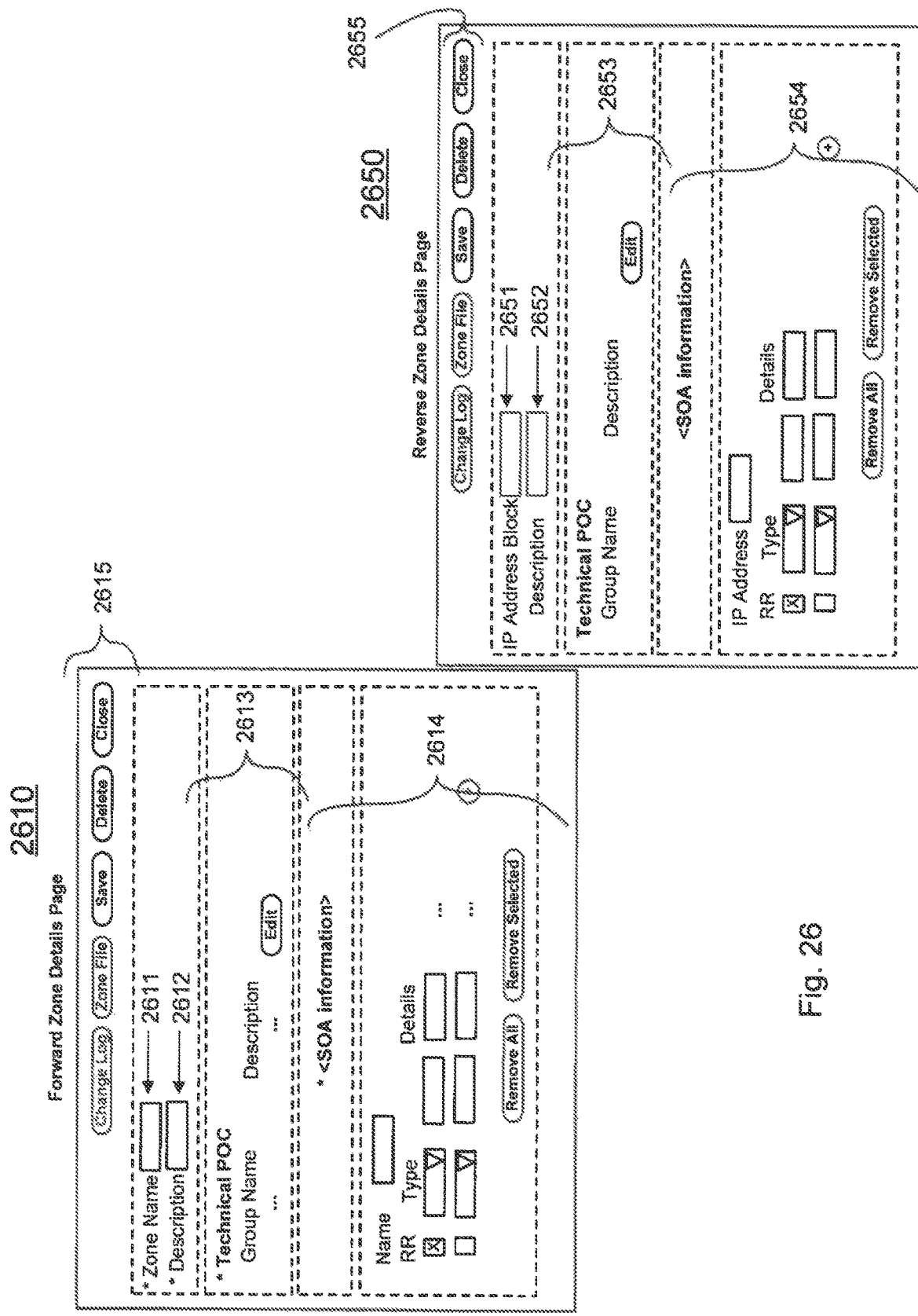

FIG. 26 is an illustration of a forward zone details page 2610 and a reverse zone details page 2650 of a DNS GUI Forward zone details page 2610 includes information related to zone-to-IP address mapping and reverse zone details page 2650 includes information related to IP address-to-zone mapping.

Forward zone details page 2610 includes graphical interface elements for entering information related to a particular zone, such as, for example, zone name 2611, description 2612, technical point of contact (POC) 2613 and start of authority (SOA) information 2614, including information associated with resource records. Forward zone details page 2610 also includes elements 2615 for changing a zone log, accessing a zone file, saving the zone information, deleting the zone information, and closing the forward zone details page 2610.

Reverse zone details page 2650 includes elements for entering information related to a particular IP address, such as, for example, IP address block 2651, description 2652, technical point of contact (POC) 2653 and SOA information 2654, which includes resource records. Reverse zone details page 2650 also includes elements 2655 for changing the IP address log, accessing a zone file, saving the IP address information, deleting the IP address information, and closing the reverse zone details page 2650. The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be mad.

What is claimed is:

1. A method for managing a network, the method performed by one or more processors, including:
   receiving, by a client Application Program Interface ("API"), a request to modify a network from a display application, the request received in a first format, the request comprising at least one of a reserve host request and an unreserve host request;
   translating, by the client API, the request from the first format into a message of a second format, the second format being a lightweight DNS management protocol (LDMP) for communicating with a network control apparatus, the network control apparatus being a DNS management server;
   providing, by the client API, the message of the second format to the network control apparatus to enable an updated configuration for the network, wherein the updated configuration for the network includes updating a configuration of a DNS server to include one of a newly created host reservation and an excluded host that has been unreserved;
   validating, by the client API, a response received from the network control apparatus in the second format; and
   translating, by the client API, the validated response from the second format into the first format for display by the display application.

2. The method of claim 1, wherein the message of the second format for communicating with the network control apparatus comprises an XML-based protocol.

3. The method of claim 1, further comprising:
   receiving, by the client API, a request to create, update, or delete a DHCP scope, and
   in response to the received request, receiving, by the client API, updates to multiple DHCP servers, the updates including a newly created scope, an updated scope, or a deleted scope based on the received request.

4. The method of claim 1, further comprising:
   receiving, by the client API, a reserve zone request, an unreserve zone request, or an update zone request; and
   in response to the received request, receiving, by the client API, from the DNS server, updates to the configuration of the DNS server, the updates including a newly created zone reservation, an updated zone, or an excluded zone that has been unreserved based on the received request.

5. The method of claim 1, wherein translating the request further comprises:
   determining a type of the request using a delegate component of the client API and sending the request type to a generator component of the client API, and
   generating a translated request using the generator component of the client API based on the request type.

6. The method of claim 1, wherein the display application provides a graphical user interface configured to show IP address allocations for the network, and wherein receiving the request to modify the network further comprises:
   receiving, by a delegate component of the client API, the request to modify the network from the display application based on a user interaction with the graphical user interface.

7. The method of claim 1, wherein the first format is at least one of hypertext markup language (HTML) and a Java object.

8. A system for managing a network, the system comprising:
   a web layer comprising at least one first computer processor providing a graphical user interface configured to display IP address allocations for a network; and
   an application layer comprising at least one second computer processor providing a client Application Program Interface ("API") that performs operations including:
   receiving a request to modify the network from a display application providing the graphical user interface, the request received in a first format, the request comprising at least one of a reserve host request and an unreserve host request;
   translating the request from the first format into a message of a second format, the second format being a lightweight DNS management protocol (LDMP) for communicating with a network control apparatus, the network control apparatus being a DNS management server;

providing the message of the second format to the network control apparatus to enable an updated configuration for the network, wherein the updated configuration for the network includes updating a configuration of a DNS server to include one of a newly created host reservation and an excluded host that has been unreserved;

validating a response received from the network control apparatus in the second format; and translating the validated response from the second format into the first format for display by the display application.

9. The system of claim 8, wherein the message of the second format for communicating with the network control apparatus comprises an XML-based protocol.

10. The system of claim 8, further comprising:
receiving, by the client API, a request to create, update, or delete a DHCP scope, and
in response to the received request, receiving, by the client API, updates to multiple DHCP servers, the updates including a newly created scope, an updated scope, or a deleted scope based on the request to modify the network.

11. The system of claim 8, further comprising:
receiving, by the client API, a reserve zone request, an unreserve zone request, or an update zone request; and
in response to the received request, receiving, by the client API, from the DNS server, updates to the configuration of the DNS server, the updates including a newly created zone reservation, an updated zone, or an excluded zone that has been unreserved based on the received request.

12. The system of claim 8, wherein translating the request by the client API further comprises:
determining a type of the request using a delegate component of the client API and sending the request type to a generator component of the client API, and
generating a translated request using the generator component of the client API based on the request type.

13. The system of claim 8, wherein receiving the request to modify the network further comprises:
receiving, by a delegate component of the client API, the request from the display application based on a user interaction with the graphical user interface.

14. A non-transitory computer-readable medium storing instructions that, when executed by a computer comprising one or more processors, cause the computer to perform operations for managing a network comprising:
receiving, by a client Application Program Interface ("API"), a request to modify the network from a display application, the request received in a first format, the request comprising at least one of a reserve host request and an unreserve host request;

translating, by the client API, the request from the first format into a message of a second format, the second format being a lightweight DNS management protocol (LDMP) for communicating with a network control apparatus, the network control apparatus being a DNS management server;

providing, by the client API, the message of the second format to the network control apparatus to enable an updated configuration for the network, wherein the updated configuration for the network includes updating a configuration of a DNS server to include one of a newly created host reservation and an excluded host that has been unreserved;

validating, by the client API, a response received from the network control apparatus in the second format; and translating, by the client API, the validated response from the second format into the first format for display by the display application.

15. The computer-readable medium of claim 14, wherein the message of the second format for communicating with the network control apparatus comprises an XML-based protocol.

16. The computer-readable medium of claim 14, further comprising:
receiving, by the client API, a request to create, update, or delete a DHCP scope, and
in response to the received request, receiving, by the client API, updates to multiple DHCP servers, the updates including a newly created scope, an updated scope, or a deleted scope based on the received request.

17. The computer-readable medium of claim 14, further comprising:
receiving, by the client API, a reserve zone request, an unreserve zone request, or an update zone request; and
in response to the received request, receiving, by the client API, from the DNS server, updates to the configuration of the DNS server, the updates including a newly created zone reservation, an updated zone, or an excluded zone that has been unreserved based on the received request.

18. The computer-readable medium of claim 14, wherein translating the request further comprises:
determining a type of the request using a delegate component of the client API and sending the request type to a generator component of the client API, and
generating a translated request using the generator component of the client API based on the request type.

19. The computer-readable medium of claim 14, wherein the display application provides a graphical user interface configured to show IP address allocations for the network, and wherein receiving the request to modify the network further comprises:
receiving, by a delegate component of the client API, the request from the display application based on a user interaction with the graphical user interface.

* * * * *